United States Patent
Fujii et al.

(10) Patent No.: US 9,764,979 B2
(45) Date of Patent: Sep. 19, 2017

(54) CUTTING METHOD FOR GLASS SHEET AND GLASS SHEET CUTTING APPARATUS

(71) Applicant: Nippon Electric Glass Co., Ltd., Shiga (JP)

(72) Inventors: Takahide Fujii, Shiga (JP); Setsuo Uchida, Shiga (JP); Naotoshi Inayama, Shiga (JP); Takayuki Noda, Shiga (JP); Sho Itoh, Shiga (JP); Michiharu Eta, Shiga (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 0 days.

(21) Appl. No.: 15/176,423

(22) Filed: Jun. 8, 2016

(65) Prior Publication Data
US 2016/0280581 A1    Sep. 29, 2016

Related U.S. Application Data

(63) Continuation of application No. 13/617,662, filed on Sep. 14, 2012, now Pat. No. 9,422,184.

(30) Foreign Application Priority Data

Sep. 15, 2011  (JP) .................................. 2011-202140
Sep. 15, 2011  (JP) .................................. 2011-202141
(Continued)

(51) Int. Cl.
*C03B 33/08*    (2006.01)
*B23K 26/14*    (2014.01)
(Continued)

(52) U.S. Cl.
CPC .......... *C03B 33/082* (2013.01); *B23K 26/142* (2015.10); *B23K 26/1438* (2015.10);
(Continued)

(58) Field of Classification Search
None
See application file for complete search history.

(56) References Cited

U.S. PATENT DOCUMENTS

| 3,589,351 A | 6/1971 | Shoupp et al. |
| 3,965,328 A | 6/1976 | Locke |

(Continued)

FOREIGN PATENT DOCUMENTS

| CN | 101613180 | 12/2009 |
| DE | 198 58 684 | 6/2000 |

(Continued)

OTHER PUBLICATIONS

English Translation of JP2007-319888, Performed by Schreiber Translation, Inc. Jul. 2015.
(Continued)

*Primary Examiner* — Lisa Herring
(74) *Attorney, Agent, or Firm* — Wenderoth, Lind & Ponack, L.L.P.

(57) ABSTRACT

Provided is a cutting method for a glass sheet, comprising radiating a laser beam to a cutting portion (C) of a glass sheet (G) having a thickness of 500 µm or less to fuse the glass sheet (G), wherein a narrowest gap between fused end surfaces (Ga1 and Gb1) of the glass sheet (G), which face each other in the cutting portion (C), is managed to satisfy a relationship of $0.1 \leq b/a \leq 2$, where "a" is a thickness of the glass sheet (G) and "b" is the narrowest gap.

5 Claims, 9 Drawing Sheets

(30) Foreign Application Priority Data

Sep. 15, 2011 (JP) ................................ 2011-202142
May 18, 2012 (JP) ................................ 2012-114582

(51) Int. Cl.

| | |
|---|---|
| *B23K 26/142* | (2014.01) |
| *B23K 26/38* | (2014.01) |
| *B23K 26/402* | (2014.01) |
| *C03B 33/02* | (2006.01) |
| *B23K 103/00* | (2006.01) |

(52) U.S. Cl.

CPC ............ *B23K 26/38* (2013.01); *B23K 26/402* (2013.01); *C03B 33/0222* (2013.01); *B23K 2203/50* (2015.10); *B23K 2203/54* (2015.10); *Y02P 40/57* (2015.11); *Y10T 428/24777* (2015.01)

(56) References Cited

U.S. PATENT DOCUMENTS

| | | | |
|---|---|---|---|
| 4,467,168 | A | 8/1984 | Morgan et al. |
| 5,902,368 | A | 5/1999 | Witzmann |
| 6,198,070 | B1 | 3/2001 | Nakayama |
| 6,475,575 | B1 | 11/2002 | Ikuta |
| 6,525,291 | B1 | 2/2003 | Sanders et al. |
| 2001/0029365 | A1 | 10/2001 | Nagahori et al. |
| 2011/0114610 | A1 | 5/2011 | Szelagowski et al. |

FOREIGN PATENT DOCUMENTS

| | | |
|---|---|---|
| EP | 0 974 417 | 1/2000 |
| JP | 60-251138 | 12/1985 |
| JP | 01-215736 | 8/1989 |
| JP | 08-116210 | 5/1996 |
| JP | 08-141764 | 6/1996 |
| JP | 2001-287076 | 10/2001 |
| JP | 2005-021964 | 1/2005 |
| JP | 2007-319888 | 12/2007 |
| JP | 2008-063207 | 3/2008 |

OTHER PUBLICATIONS

English Translation of JP08-141764 by FLS, Inc. Jul. 2015.
JP2007-319888 Machine Translation Performed by JPO Website Jun. 23, 2015.
JP08-141764 Machine Translation Performed by JPO Website Jun. 23, 2015.
Caristan, Laser Cutting Guide for Manufacturing, Society of Manufacturing Engineers, 2004, p. 241.
Gladush et al., Physics of Laser Materials Processing: Theory and Experiment, Springer Science & Business Media, Aug. 5, 2011, pp. 327-328.
Extended European Search Report dated Nov. 12, 2015 in corresponding European Patent Application No. 15173829.1.
Chinese Office Action dated May 21, 2015 in corresponding Chinese Patent Application No. 201280030903.3 with English translation.
International Preliminary Report on Patentability and Written Opinion of the International Searching Authority dated Mar. 27, 2014 in International (PCT) Application No. PCT/JP2012/073717.
International Search Report dated Dec. 4, 2012 in International (PCT) Application No. PCT/JP2012/073717.

CUTTING METHOD FOR GLASS SHEET AND GLASS SHEET CUTTING APPARATUS

TECHNICAL FIELD

The present invention relates to an improvement of a cutting technology for fusing glass sheets.

BACKGROUND ART

Conventionally, as a cutting method for glass sheets, there has been widely used a method of cleaving a glass sheet by applying a bending stress to a scribe line formed with a diamond cutter or the like on a surface of the glass sheet (cleaving using a bending stress).

However, in the above-mentioned cutting method using the bending stress, cracks are liable to be formed in cut surfaces, which may lead to a problem that the glass sheet is broken from the cracks. As a countermeasure, instead of the above-mentioned cutting method using the bending stress, in some cases, there has been employed laser fusing for cutting a cutting portion of the glass sheet by melting the cutting portion by using irradiation heat generated by radiating a laser beam to the cutting portion of the glass sheet.

As a cutting method for a glass sheet using the laser fusing, for example, Patent Literature 1 discloses a method in which a glass sheet is fused by radiating a carbon dioxide laser beam obtained by condensing onto a micro spot to a cutting subject portion after being preheated with a defocused carbon dioxide laser beam.

Further, normally, in the laser fusing, a glass substrate is cut (fused) while blowing off melts, which are generated at the cutting portion by irradiation heat of a laser beam, with a center assist gas jetted together with the laser beam substantially vertically downward from just above the cutting portion.

In this case, the melts scattered by the center assist gas may become a foreign matter called dross and adhere to a glass sheet, which constitutes a factor of deterioration in product quality of the glass sheet. Under the circumstances, various measures have been taken to prevent adhesion of such a foreign matter during laser fusing.

For example, although not relating to glass sheet cutting, Patent Literature 2 discloses the following cutting method for preventing adhesion of dross generated at the time of fusing of ceramics and metals. Specifically, the cutting method disclosed in Patent Literature 2 includes: jetting an assist gas (corresponding to the above-mentioned center assist gas) substantially vertically downward from a processing nozzle arranged just above a cutting portion of an object to be processed; scattering a molten foreign matter (such as the dross) toward a waste side of the object to be processed by blowing, from auxiliary nozzles, gases other than the assist gas onto both front and back surfaces of the cutting portion of the object to be processed from the product side thereof; and sucking the molten foreign matter with a suction nozzle just below the cutting portion of the object to be processed.

CITATION LIST

Patent Literature 1: JP 60-251138 A
Patent Literature 2: JP 8-141764 A

SUMMARY OF INVENTION

Technical Problems

<First Object>

It is an object of the invention disclosed in Patent Literature 1 to mainly cut a thick flat glass having a thickness of 1 mm or more into a predetermined shape. Such a thick flat glass is excellent in mechanical strength.

Meanwhile, a mechanical strength of a thin flat glass used for displays and the like in recent years, in particular, of a thin flat glass having a thickness of 500 μm or less is much lower than that of the above-mentioned thick flat glass. Thus, in a case of cutting such a thin flat glass by fusing, the following peculiar problems may occur.

Specifically, a first problem is that, when fused end surfaces are brought into contact with each other at the time of dividing the thin flat glass after fusing, the thin flat glass is easily broken. Thus, it is necessary to melt and remove the cutting portion of the thin flat glass by fusing so that a gap is secured to some extent between the fused end surfaces of the thin flat glass, which face each other after fusing.

A second problem is that, when a higher quantity of heat is applied to the thin flat glass, as illustrated in FIG. 18, a cutting portion C in a molten state hangs, which causes vicinities of fused end surfaces of a glass sheet G to be defectively shaped. When the glass sheet G is defectively shaped in this way, it is impossible to avoid a situation where the glass sheet G is treated as a defective product without being provided as a product. Such a shape defect of the vicinities of the fused end surfaces of the thin flat glass becomes more conspicuous as the gap between the fused end surfaces becomes larger by increasing the melting and removing amount of the thin flat glass. Therefore, it is impossible to set the gap between the fused end surfaces of the thin flat glass to be unnecessarily large. Further, the larger quantity of heat is applied, and hence a glass temperature near the fused end surfaces increases in accordance therewith, which leads to a risk that the thin flat glass is deformed or broken by distortion.

Thus, when the thin flat glass is cut by fusing, it is necessary to strictly manage the gap between the fused end surfaces formed by fusing. However, at present, measures from such viewpoints have not yet been taken as in Patent Literature 1 or others.

In view of the above-mentioned circumstances, it is a first object of the present invention to satisfactorily maintain the shape of the vicinities of the fused end surfaces by managing the gap between the fused end surfaces of the thin flat glass at the time of fusing the thin flat glass with irradiation heat of a laser beam.

<Second Object>

When a glass sheet is fused, a cutting portion of the glass sheet is molten with irradiation heat of a laser beam, and hence a vicinity of the cutting portion of the glass sheet is softened.

However, in Patent Literature 2, a jetting pressure of the assist gas jetted from the processing nozzle is set to be higher than jetting pressures of the other gases jetted from the auxiliary nozzles. Thus, the following problem may occur in case where those jetting pressures are employed in cutting of the glass sheet G.

Specifically, when the jetting pressure of the assist gas jetted from the processing nozzle is excessively high, the vicinity of the cutting portion of the glass sheet in a molten state is forcefully pressed downward by the jetting pressure. As a result, as illustrated in FIG. 18, the vicinity of the cutting portion C of the glass sheet G in a molten state hangs, which may cause the cutting portion C to be formed into a defective shape (strictly speaking, vicinity of a cut end surface Ga1 of a product portion Ga and a cut end surface Gb1 of a non-product portion Gb).

As for glass sheets, when the cutting portion is defectively shaped in this way, not only deterioration in product quality but also serious problems such as breakage occur.

In view of the above-mentioned circumstances, it is a second object of the present invention to cut a glass sheet to be produced as a product by fusing without defectively shaping cut end surfaces of the glass sheet.

<Third Object>

In Patent Literature 2, the suction nozzle is arranged only just below the cutting portion of the object to be processed so that adhering substances such as dross, which drop from the cutting portion of the object to be processed, are sucked by the suction nozzle.

However, as for glass sheets, high surface cleanliness is required in many cases. Thus, in a case where the cutting method disclosed in Patent Literature 2 is applied as it is to the glass sheets, the following problem occurs. Specifically, when the molten foreign matter generated at the cutting portion at the time of fusing of the glass sheet is blown off with the gases jetted from the auxiliary nozzles, the molten foreign matter is scattered to the non-product portion side (waste side in Patent Literature 2) of the glass sheet. In addition, a minute molten foreign matter floats in the air. Thus, when being left as it is, the floating molten foreign matter may re-adhere to the product portion side of the glass sheet.

As a countermeasure, in Patent Literature 2, the suction nozzle is arranged below the object to be processed. However, it is conceived that the molten foreign matter that can be captured by such a suction nozzle is mainly a large foreign matter which falls by gravity from the cutting portion without floating in the air. Therefore, it is substantially impossible to sufficiently capture the minute molten foreign matter floating in the air. In particular, under a state in which the cutting portion has not yet been penetrated during a process of fusing, the molten foreign matter cannot be sucked at all, and conspicuously floats in a space above the glass sheet.

In view of the above-mentioned circumstance, it is a third object of the present invention to reliably reduce a risk that the molten foreign matter such as dross adheres to the glass sheet to be produced as a product at the time of fusing the glass sheet with irradiation heat of a laser beam.

<Fourth Object>

When a glass sheet is cut by a laser fusing method, a viscosity of the molten glass is higher than those of ceramics and metals as disclosed in Patent Literature 2. Thus, an operation of removing a molten glass portion generated at a laser irradiation portion is very troublesome and complicated. Further, glass has relatively low thermal conductivity, and hence difficulty in removing the molten glass portion becomes much higher.

In detail, the molten glass portion generated from the glass sheet cannot be easily removed by simply jetting an assist gas to the laser irradiation portion, and hence a longer time period is required to cut the glass sheet. As a result, operational efficiency is deteriorated. In addition, when the molten glass portion generated from the glass sheet cannot be smoothly removed, quality of cut surfaces of the glass sheet is deteriorated.

Further, according to the disclosure of Patent Literature 2, the assist gas is jetted from just above to the laser irradiation portion on a metal plate or a ceramic plate. When such a method is applied to the glass sheet, the following peculiar problems may occur.

Specifically, the molten glass portion of the glass sheet is forcefully pressed downward by the assist gas, which leads to a situation where the molten glass portion hangs by pressure of the assist gas without being scattered owing to its high viscosity. Thus, a thickness in a vicinity of the cut surfaces of the glass sheet after cutting is larger than thicknesses of other parts (sheet thicknesses of the glass sheet). As a result, there arise problems of the defective shape of the cut surfaces and deterioration in quality of the cut surfaces.

Further, as for the glass sheet, glass itself is an oxide. Thus, unlike the case of performing laser fusing of a metal plate and the like, it cannot be expected that the glass sheet is efficiently cut by oxidation combustion reaction. As a result, the above-mentioned problems are more conspicuous.

In view of the above-mentioned circumstances, it is a fourth object of the present invention to improve operability at the time of cutting the glass sheet and enhancing the quality of the cut surfaces of the glass sheet after cutting by elaborating the laser fusing method for a glass sheet.

Solution to Problem

<First Invention>

According to a first invention devised to achieve the above-mentioned first object, there is provided a cutting method for a glass sheet, comprising radiating a laser beam to a cutting portion of the glass sheet (hereinafter referred to as thin flat glass in some cases) having a thickness of 500 µm or less, to thereby fuse the glass sheet, wherein a narrowest gap between fused end surfaces of the thin flat glass, which face each other in the cutting portion, is managed to satisfy a relationship of $0.1 \leq b/a \leq 2$, where "a" is a thickness of the glass sheet and "b" is the narrowest gap.

According to such a method, the gap between the fused end surfaces of the thin flat glass is strictly managed based on the relationship relative to the thickness of the thin flat glass. With this, the thin flat glass can be safely divided by fusing while satisfactorily maintaining a shape of a vicinity of each of the fused end surfaces. Further, the thin flat glass can avoid being deformed or broken by distortion. Meanwhile, when b/a exceeds 2, an excessively large amount of the thin flat glass is molten and removed by fusing, and an excessively high quantity of heat is applied to the vicinity of each of the fused end surfaces. As a result, defective shaping such as hanging may occur in the vicinity of each of the fused end surfaces of the thin flat glass, or the thin flat glass may be deformed or broken by distortion. Meanwhile, when b/a is less than 0.1, the fused end surfaces come excessively close to each other, and hence the fused end surfaces may be brought into contact with each other at the time of separation, which may cause breakage of the thin flat glass.

In the above-mentioned method, it is preferred that the radiating the laser beam to the cutting portion be carried out in a defocus state.

In other words, the cutting portion of the thin flat glass as an object of fusing can be sufficiently fused even with the defocused laser beam. When the defocused laser beam is radiated to the cutting portion in this way, an energy density of the laser beam decreases at a position corresponding to the cutting portion. Therefore, a variation amount of energy around the irradiation position decreases in accordance therewith. As a result, there is an advantage that, even when the irradiation position is somewhat changed, for example, by deflection or vibration of the glass sheet, irradiation heat applied to the cutting portion is less liable to vary, and hence fusing can be executed under substantially the uniform condition.

In the above-mentioned method, it is preferred that the laser beam have a spot diameter that is smaller than the narrowest gap between the fused end surfaces of the glass sheet.

With this, the laser beam is radiated in a range smaller than a range in which the molten glass portion is actually molten and removed. Thus, it can be expected that annealing treatment on the fused end surfaces of the thin flat glass is performed by thermal conduction from the irradiation portion which is irradiated with the laser beam.

In the above-mentioned method, it is preferred that at least one of the fused end surfaces comprises a convex curved surface.

With this, an effect of increasing strengths of the fused end surfaces of the thin flat glass to be equivalent to or greater than a case where chamfering is performed is obtained. Thus, in the cutting step and subsequent steps, the fused end surfaces are less liable to be chipped, which leads to advantages of easier handling and higher yields.

In the above-mentioned method, it is preferred that at least one of the fused end surfaces comprises a fire-polished surface.

With this, surfaces of the fused end surfaces of the thin flat glass are formed to be smoothly continuous, and hence generation of dust from the fused end surfaces can be prevented. Further, such smooth surfaces of the fused end surfaces prevent intrusion of particles, and hence fouling in the above-mentioned steps can also be prevented.

In the above-mentioned method, it is preferred that at least one of the fused end surfaces has an arithmetic mean roughness Ra of 0.3 μm or less, and a mean length RSm of a roughness curve element of 150 μm or more. In this case, the arithmetic mean roughness Ra and the mean length RSm of the roughness curve element are stipulated by JIS 2001.

With this, the surfaces of the fused end surfaces of the thin flat glass are formed to be smoothly continuous, and hence generation of dust from the fused end surfaces can be prevented. Further, such smooth surfaces of the fused end surfaces prevent intrusion of particles, and hence fouling in the above-mentioned steps can also be prevented. Meanwhile, when Ra exceeds 0.3 μm, or when RSm is less than 150 μm, the fused end surfaces of the thin flat glass are roughened (a roughened state). As a result, the particles intrude into the fused end surfaces and are difficult to remove.

In the above-mentioned method, it is preferred that the fused end surface has a residual compressive stress ranging from 20 MPa to 500 MPa.

With this, a compressive stress acts on the fused end surfaces of the thin flat glass. Thus, even when defects such as cracks are formed in the fused end surfaces, a force acts in a direction in which such defects are closed. As a result, strengths of the fused end surfaces of the thin flat glass are enhanced. Further, even in a case where cracks are generated in the fused end surfaces of the thin flat glass, a tension layer exists near the cracks, and hence the cracks are propagated along the fused end surfaces without being propagated to an in-plane side. Therefore, a shape as a glass substrate can be maintained, and performance as the glass substrate is not deteriorated. Meanwhile, in a case where the compressive stress is less than 20 MPa, when the thin flat glass is broken, the cracks may be propagated in any direction, which leads to a risk that the performance as the glass substrate is deteriorated. Further, when the compressive stress is more than 500 MPa, the thin flat glass may self-break by an influence of the tension layer near the cracks.

According to the first invention devised to achieve the above-mentioned first object, there is provided a glass sheet, comprising a fused end surface formed by fusing with a laser beam and having a thickness of 500 μm or less, wherein the fused end surface has an arithmetic mean roughness Ra of 0.3 μm or less, and a mean length RSm of a roughness curve element of 150 μm or more.

In this case, it is preferred that the fused end surface has a residual compressive stress ranging from 20 MPa to 500 MPa.

<Second Invention>

According to a second invention devised to achieve the above-mentioned second object, there is provided a cutting method for a glass sheet, comprising radiating a laser beam to a cutting portion of the glass sheet while jetting an assist gas to the cutting portion, to thereby divide the glass sheet by fusing into a product portion and a non-product portion using the cutting portion as a boundary, wherein the assist gas comprises: a center assist gas jetted just below from a position above the cutting portion to the cutting portion in a space above the glass sheet; and a side assist gas jetted obliquely downward from an upper position on the product portion side to the cutting portion in the space above the glass sheet, and wherein the side assist gas has a jetting pressure that is higher than a jetting pressure of the center assist gas.

According to such a method, the jetting pressure of the center assist gas is relatively weakened, and hence the side assist gas mainly blows off the molten foreign matter (such as dross) at the cutting portion, which is generated at the time of fusing. This side assist gas is jetted obliquely downward from the upper position on the product portion side to the cutting portion, and hence a force of pressing downward the vicinity of the cutting portion in the molten state of the glass sheet is weaker than that of the center assist gas. Therefore, the cutting portion in the molten state of the glass sheet can be prevented from hanging. Then, under the state in which the cutting portion is prevented from hanging, the molten foreign matter generated at the cutting portion is scattered by the side assist gas preferentially to the non-product portion side. Thus, the molten foreign matter is less liable to be deposited on the cut end surface of the product portion. In this way, the cut end surface of the product portion can be maintained in the satisfactory substantially circular-arc shape.

According to the second invention devised to achieve the above-mentioned second object, there is provided a cutting method for a glass sheet, comprising radiating a laser beam to a cutting portion of the glass sheet while jetting an assist gas to the cutting portion, to thereby divide the glass sheet by fusing into a product portion and a non-product portion using the cutting portion as a boundary, wherein the assist gas includes only a side assist gas jetted obliquely downward from an upper position on the product portion side to the cutting portion in a space above the glass sheet.

According to such a method, the center assist gas jetted just below from the position above the cutting portion in the space above the glass sheet to the cutting portion does not exist. Thus, only the side assist gas blows off the foreign matter (such as dross) at the cutting portion, which is generated at the time of fusing. This side assist gas is jetted obliquely downward from the upper position on the product portion side to the cutting portion, and hence the force of pressing downward the vicinity of the cutting portion in the molten state of the glass sheet is weaker than that of the center assist gas. Therefore, the cutting portion in the molten state of the glass sheet can be prevented from hanging. Then, under the state in which the cutting portion is prevented from hanging in this way, the foreign matter generated at the cutting portion is scattered by the side assist gas preferentially to the non-product portion side. Thus, the foreign matter is less liable to be deposited on the cut end surface of the product portion. In this way, the cut end surface of the product portion can be maintained in the satisfactory substantially circular-arc shape.

In the above-mentioned method, it is preferred that the side assist gas be jetted at an inclination angle of from 25° to 60° with respect to an upper surface of the glass sheet.

In other words, when the inclination angle of the side assist gas with respect to the upper surface of the glass sheet is less than 25°, the side assist gas is jetted at an excessively low angle with respect to the glass sheet, which may cause a problem that the side assist gas cannot be efficiently supplied to the cutting portion. Meanwhile, when the inclination angle of the side assist gas with respect to the upper surface of the glass sheet exceeds 60°, the side assist gas is jetted at an excessively high angle with respect to the glass sheet, which leads to a risk that the force of pressing the vicinity of the cutting portion downward becomes larger. Thus, it is preferred that the inclination angle of the side assist gas fall within the above-mentioned numerical range. Within this range, the force of the side assist gas, with which the vicinity of the cutting portion is pressed downward, can be appropriately suppressed while the side assist gas is supplied efficiently to the cutting portion.

In the above-mentioned method, it is preferred that the assist gas further comprise an auxiliary side assist gas jetted obliquely upward from a lower position on the product portion side to the cutting portion in a space below the glass sheet.

With this, the foreign matter generated at the cutting portion can be efficiently blown off also from below the glass sheet toward the non-product portion side. Further, the side assist gas acts on the lower surface of the glass sheet, and hence an effect of supporting the vicinity of the cutting portion of the glass sheet from below can be expected, which is conceived to contribute to prevention of hanging of the vicinity of the cutting portion.

In the above-mentioned method, the radiating the laser beam to the glass sheet may be carried out in a defocus state.

With this, an energy density of the laser beam decreases at a position corresponding to the cutting portion. Therefore, a variation amount of energy around the irradiation position decreases in accordance therewith. As a result, there is an advantage that, even when the irradiation position is somewhat changed, for example, by deflection or vibration of the glass sheet, irradiation heat applied to the cutting portion is less liable to vary, and hence fusing can be executed under substantially the uniform condition.

According to the second invention devised to achieve the above-mentioned second object, there is provided a glass sheet cutting device, comprising: assist gas jet means; and laser irradiation means, the glass sheet cutting device being configured to radiate a laser beam from the laser irradiation means to a cutting portion of a glass sheet while jetting an assist gas from the assist gas jet means to the cutting portion, to thereby divide the glass sheet by fusing into a product portion and a non-product portion using the cutting portion as a boundary, wherein the assist gas jet means comprises: center assist gas jet means for jetting a center assist gas just below from a position above the cutting portion to the cutting portion in a space above the glass sheet; and side assist gas jet means for jetting a side assist gas obliquely downward from an upper position on the product portion side to the cutting portion in the space above the glass sheet, the side assist gas means jetting the side assist gas with a jetting pressure higher than a jetting pressure of the center assist gas.

With such a structure, the same functions and advantages as those of the corresponding structures described above can be obtained.

According to the second invention devised to achieve the above-mentioned second object, there is provided a glass sheet cutting device, comprising: assist gas jet means; and laser irradiation means, the glass sheet cutting device being configured to radiate a laser beam from the laser irradiation means to a cutting portion of a glass sheet while jetting an assist gas from the assist gas jet means to the cutting portion, to thereby divide the glass sheet by fusing into a product portion and a non-product portion using the cutting portion as a boundary, wherein the assist gas jet means includes only side assist gas jet means for jetting a side assist gas obliquely downward from an upper position on the product portion side to the cutting portion in a space above the glass sheet.

With such a structure, the same functions and advantages as those of the corresponding structures described above can be obtained.

In the above-mentioned structures, it is preferred that the assist gas jet means further comprise auxiliary side assist gas jet means for jetting an auxiliary side assist gas obliquely upward from a lower position on the product portion side in a space below the glass sheet to the cutting portion.

<Third Invention>

According to a third invention devised to achieve the above-mentioned third object, there is provided a glass sheet cutting device, configured to radiate, under a state in which a glass sheet is placed on a support stage having a non-support space at a position below a cutting portion of the glass sheet, a laser beam to the cutting portion while jetting an assist gas to the cutting portion to fuse the glass sheet into a product portion and a non-product portion using the cutting portion as a boundary, the glass sheet cutting device comprising: first gas jet means for jetting the assist gas obliquely downward to the cutting portion, the first gas jet means being arranged at an upper position on the product portion side in a space above the glass sheet; first suction means for sucking a molten foreign matter generated during a process of the fusing, the first suction means being arranged at an upper position on the non-product portion side in the space above the glass sheet; second gas jet means for jetting the assist gas obliquely upward to the cutting portion, the second gas jet means being arranged at a lower position on the product portion side in a space below the glass sheet; and second suction means for sucking the molten foreign matter in the non-support space, the second suction means being arranged in the space below the glass sheet. In this case, the term "molten foreign matter" represents a foreign matter such as dross generated at the time of fusing of the glass sheet, and includes a molten foreign matter and a solidified foreign matter (the same applies hereinafter).

With such a structure, the assist gases are jetted obliquely from both above and below on the product portion side of the glass sheet to the cutting portion, and hence the molten foreign matter at the cutting portion can be reliably blown off to the non-product portion side. Then, the molten foreign matter blown off by the upper and lower assist gases is sucked by the first suction means and the second suction means arranged respectively above and below the glass sheet. Thus, in the space above the glass sheet and in the space below the glass sheet, the floating molten foreign matter can be reliably captured. As a result, it is possible to reliably reduce a risk that the molten foreign matter adheres to the product portion of the glass sheet.

In the above-mentioned structure, it is preferred that the second suction means comprise a suction port elongated along a preset cutting line across the cutting portion.

This is because, in the space below the glass sheet, the molten foreign matter tends to be scattered over a wide range. Thus, in terms of reliably capturing the molten foreign matter, it is preferred that the suction port of the second suction means arranged in the space below the glass sheet be elongated along the preset cutting line (cutting direction of the glass sheet).

In the above-mentioned structure, it is preferred that the second suction means be arranged relatively on the non-product portion side.

Specifically, also in the space below the glass sheet, in other words, in the non-support space, the molten foreign matter is blown off to the non-product portion side by the first gas jet means or the second gas jet means. Thus, when the second suction means is arranged relatively on the non-product portion side, the molten foreign matter can be efficiently captured.

In the above-mentioned structure, the first gas jet means may jet the assist gas at an inclination angle of from 15° to 45° with respect to an upper surface of the glass sheet.

When the assist gas is jetted at such an inclination angle, the molten foreign matter can be efficiently blown off to the product portion side. In other words, when the inclination angle of the first gas jet means is less than 15°, the assist gas acts less efficiently on the cutting portion, which leads to a risk that the force of blowing off the molten foreign matter to the non-product portion side cannot be sufficiently exerted. Meanwhile, when the inclination angle of the first gas jet means exceeds 45°, the force of the assist gas, by which the molten foreign matter is blown off to the non-product portion side, may be weakened.

In the above-mentioned structure, the support stage may comprise a side surface portion facing the non-support space on the product portion side and serving as a tapered surface for guiding obliquely upward the assist gas jetted from the second gas jet means.

With this, the assist gas can be guided obliquely upward with the tapered surface of the side surface portion of the support stage, which enables the assist gas jetted from the second gas jet means to reliably act on the cutting portion of the glass sheet.

In the above-mentioned structure, the support stage may comprise a gas flow path for guiding obliquely upward the assist gas jetted from the second gas jet means to discharge the assist gas into the non-support space, the gas flow path being provided at a part of the support stage facing the non-support space on the product portion side.

With this, the assist gas can be guided obliquely upward with the gas flow path of the support stage, which enables the assist gas jetted from the second gas jet means to reliably act on the cutting portion of the glass sheet.

In the above-mentioned structure, it is preferred that the laser beam be radiated in a defocus state to the glass sheet.

With this, an energy density of the laser beam decreases at a position corresponding to the cutting portion. Therefore, a variation amount of energy around the irradiation position decreases in accordance therewith. As a result, there is an advantage that, even when the irradiation position is somewhat changed, for example, by deflection or vibration of the glass sheet, irradiation heat applied to the cutting portion is less liable to vary, and hence fusing can be executed under substantially the uniform condition.

According to the third invention devised to achieve the above-mentioned third object, there is provided a cutting method for a glass sheet, comprising radiating, under a state in which a glass sheet is placed on a support stage having a non-support space along a cutting portion of the glass sheet, a laser beam to the cutting portion while jetting an assist gas to the cutting portion to fuse the glass sheet into a product portion and a non-product portion using the cutting portion as a boundary, wherein the jetting of the assist gas comprises: jetting the assist gas obliquely downward from an upper position on the product portion side to the cutting portion in a space above the glass sheet; sucking, at an upper position on the non-product portion side in the space above the glass sheet, a molten foreign matter generated during a process of the fusing; jetting the assist gas obliquely upward from a lower position on the product portion side to the cutting portion in a space below the glass sheet; and sucking, in the space below the glass sheet, the molten foreign matter in the non-support space.

With such a method, the same functions and advantages as those of the corresponding structures described above can be obtained.

<Fourth Invention>

According to a fourth invention devised to achieve the above-mentioned fourth object, there is provided a laser fusing method for a glass sheet, comprising jetting an assist gas to an irradiation portion which is irradiated with a laser beam while radiating the laser beam from a front surface side of a glass sheet to generate a molten glass portion so that a recessed portion is formed in the molten glass portion and the recessed portion is propagated to a back surface of the glass sheet, thereby cutting and dividing the glass sheet, wherein the jetting of the assist gas comprises: jetting the assist gas in a direction inclined with respect to the front surface of the glass sheet so that a part of the molten glass portion of the glass sheet is thickened toward a side to which the assist gas is jetted and another part of the molten glass portion of the glass sheet is blown off toward the side to which the assist gas is jetted, to thereby form the recessed portion and an inclined wall portion, the inclined wall portion being inclined oppositely to an inclination of a jetting direction of the assist gas and formed of the thickened part of the molten glass portion in the recessed portion; and subsequently guiding the assist gas to the back surface side of the glass sheet along the inclined wall portion so that a wall portion facing the inclined wall portion in the recessed portion is formed as a cut surface having a convex curved-surface shape.

According to such a method, first, the recessed portion comprising the inclined wall portion is formed in the molten glass portion of the glass sheet by radiation of the laser beam and jetting of the assist gas in the direction inclined with respect to the front surface of the glass sheet. Then, by utilizing this inclined wall portion, the assist gas is smoothly guided to the back surface side of the glass sheet. With this, with respect to the glass sheet which exhibits high viscosity in a molten state and has low thermal conductivity, laser fusing can be smoothly performed within a short period of time. As a result, operational efficiency at the time of cutting the glass sheet is improved, and product quality of the cut surfaces of the glass sheet after cutting is enhanced. Further, the assist gas is jetted obliquely to the front surface of the glass sheet, and is turned in a midway so as to be discharged obliquely to the back surface. In this way, troubles in a case where the assist gas is jetted perpendicularly to the front surface of the glass sheet, specifically, a trouble that a part of the molten glass portion of the glass sheet hangs from the back surface is avoided. As a result, the product quality of the cut surfaces of the glass sheet can be further enhanced. In addition, the cut surfaces of the glass sheet each have a convex curved-surface shape. Thus, it is unnecessary to perform a chamfering process, and in addition, the glass sheet having excellent end surfaces as a product can be obtained.

In the above-mentioned method, it is preferred that an inclination angle between the jetting direction of the assist gas and the front surface of the glass sheet range from 20° to 65°.

This is because, when the inclination angle between the jetting direction of the assist gas and the front surface of the glass sheet is excessively high, during the process of cutting the glass sheet, the gap formed between the cut surfaces of the glass sheet after cutting becomes narrower along with a decrease in amount by which the molten glass is removed from the irradiation portion which is irradiated with the laser beam. As a result, for example, in a case where the glass sheet subjected to cutting is picked up from a processing table for cutting and transferred to subsequent steps, the cut surfaces may contact or slide with respect to each other. In contrast, when the inclination angle is excessively low, the molten glass may be unnecessarily scattered and the scattered molten glass may adhere as dross to the cut surfaces. However, as long as the inclination angle is set within the above-mentioned range, such troubles do not occur.

In the above-mentioned method, it is preferred that the jetting of the assist gas further comprise jetting a side assist gas to the irradiation portion which is irradiated with the laser beam from a direction which is on a side opposite to the assist gas with respect to the irradiation portion and is inclined with respect to the front surface of the glass sheet.

With this, the molten glass can be prevented from being unnecessarily scattered by pressure of the side assist gas. Further, the part of the molten glass portion, which is thickened by the assist gas, is cooled by a part of a jet flow of the side assist gas. Thus, re-solidification of the molten glass of the thickened part is promoted, with the result that formation of the inclined wall portion is promoted.

In the above-mentioned method, it is preferred that the side assist gas have a jetting pressure that is lower than a jetting pressure of the assist gas.

With this, the above-mentioned effects can be obtained without impairing an effect that the molten glass portion is smoothly removed by the assist gas.

In the above-mentioned method, it is preferred that the jetting of the assist gas further comprise jetting a center assist gas from a position facing, in the irradiation portion which is irradiated with the laser beam, the front surface of the glass sheet to the irradiation portion.

When the center assist gas is jetted to the irradiation portion in this way, removal of the molten glass portion can be promoted. Further, it is possible to prevent, as much as possible, a risk that a part of the molten glass, which is volatilized by irradiation heat of the laser beam, scatters and adheres as dross to a condenser lens for radiating the laser beam to the irradiation portion. In addition, a part of a jet flow of the center assist gas cools the part of the molten glass portion, which is thickened by the assist gas. Also with this, formation of the inclined wall portion is promoted.

Of respective glass sheets obtained after the cutting and the dividing, a glass sheet on a side from which the assist gas is jetted may be produced as a product, and a glass sheet on the side to which the assist gas is jetted may be produced as a non-product.

With this, quality of the glass sheet on the side from which the assist gas is jetted can be enhanced, and the glass sheet on the side to which the assist gas is jetted can be wasted.

Advantageous Effects of Invention

According to the first invention as described above, the gap between the fused end surfaces of the thin flat glass is strictly managed based on the relationship relative to the thickness of the thin flat glass. As a result, the shape of the vicinity of each of the fused end surfaces of the thin flat glass can be satisfactorily maintained. Further, the fused thin flat glasses can be safely separated without bringing the fused end surfaces into contact with each other.

According to the second invention as described above, it is possible to suppress the force by which the vicinity of the cutting portion in the molten state is pressed downward by the jetted gas. Thus, the glass sheet can be cut by fusing without defectively shaping the cut end surface of the product portion of the glass sheet.

According to the third invention as described above, the assist gases are jetted from both above and below to the cutting portion of the glass sheet, and the molten foreign matter blown off by the assist gases is captured by being sucked above and below the glass sheet. Thus, it is possible to reliably reduce a risk that the molten foreign matter adheres to the product portion of the glass sheet, and to satisfactorily maintain cleanliness of the product portion.

According to the fourth invention as described above, during the laser fusing of the glass sheet, the operational efficiency at the time of cutting the glass sheet is improved, and the product quality of the cut surfaces of the glass sheet after cutting is enhanced.

DESCRIPTION OF EMBODIMENTS

In embodiments of first to fourth inventions described below, a glass sheet refers to a glass substrate for flat panel displays, which has a thickness of 500 μm or less. As a matter of course, the glass sheet to be cut is not limited to the glass substrate for flat panel displays, and may be glass substrates utilized in various fields, such as a glass substrate for solar cells, OLED illumination devices, touch panels, and digital signages, and laminated bodies formed of such glass substrates and organic resins. Note that, a thickness of the glass sheet is not particularly limited, but is preferably 300 μm or less, and particularly preferably 200 μm or less.

Embodiments of First Invention

In the following, description is made of the above-mentioned embodiment of the first invention with reference to the drawings. Note that, in the following, a glass sheet refers to a glass substrate for flat panel displays, which has a thickness 500 μm or less. As a matter of course, the glass sheet to be cut is not limited to the glass substrate for flat panel displays, and may be glass substrates utilized in various fields, such as a glass substrate for solar cells, OLED illumination devices, touch panels, and digital signages, and laminated bodies formed of such glass substrates and organic resins.

(1) First Embodiment

Figure 1:
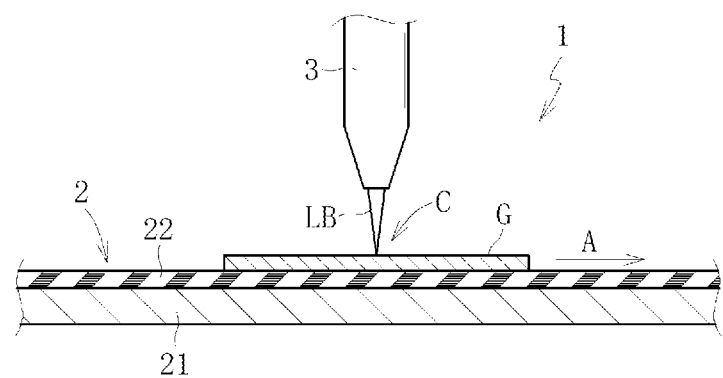
FIG. 1 A vertical sectional side surface of a glass sheet cutting device according to a first embodiment of a first invention.

As illustrated in FIG. 1, a glass sheet cutting device 1 according to a first embodiment of the first invention comprises a support stage 2 for supporting from below a glass sheet G in a flat posture and a laser irradiator 3 for fusing and dividing the glass sheet G supported by the support stage 2.

The support stage 2 comprises a stage main body 21 and a conveyer 22 which moves along an upper surface of the stage main body 21. The glass sheet G is conveyed downstream in a conveying direction (arrow A direction in FIG. 1) along a preset cutting line CL by movement of the conveyer 22. In this case, the stage main body 21 functions to guide the conveyer 22. Note that, the conveyer 22 comprises a large number of vents (not shown), and the glass sheet G is conveyed while being held on the conveyer 22 by attraction through intermediation of those vents. As a matter of course, there may be employed other conveying methods such as a method of conveying the glass sheet G with a conveyer while sandwiching widthwise end portions of the glass sheet G from both front and back sides without attracting the glass sheet G.

Figure 2:
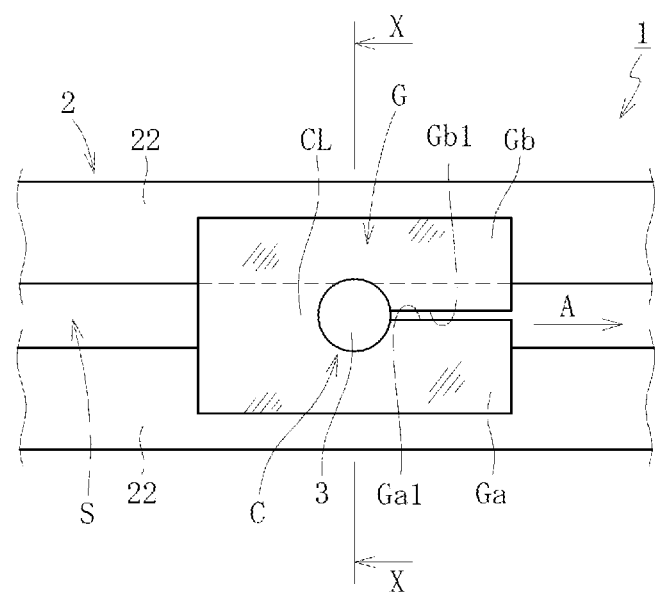
FIG. 2 A plan view of the glass sheet cutting device of FIG. 1.

As illustrated in FIG. 2, the stage main body 21 and the conveyer 22 are each divided at an interval in the width direction of the glass sheet G, and a non-support space S is formed at a position below the preset cutting line CL of the glass sheet G. In this non-support space S, a lower surface of the glass sheet G and the support stage 2 are out of contact with each other, and the lower surface of the glass sheet G is exposed to the non-support space S.

Figure 3:
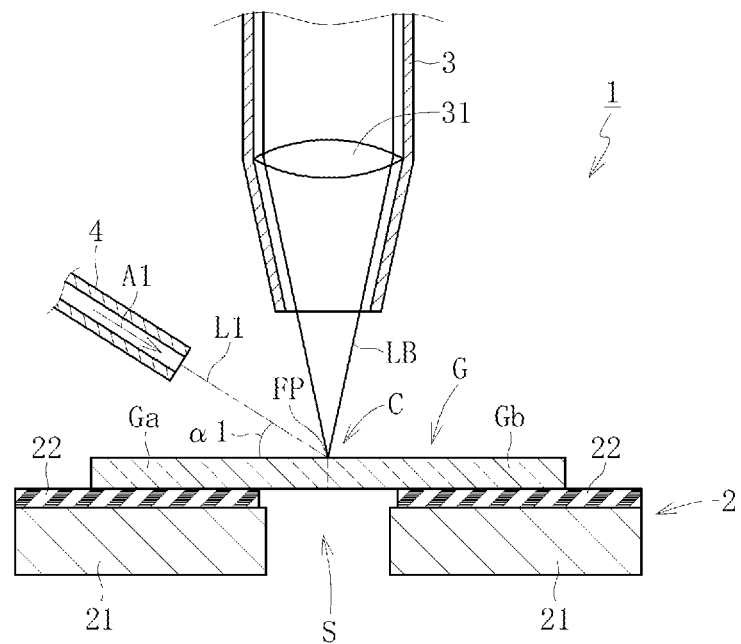
FIG. 3 A sectional view taken along the line X-X of FIG. 2.

As illustrated in FIG. 3, the laser irradiator 3 has an interior space for propagating a laser beam LB, and comprises a lens 31 provided in this space. In this embodiment, the laser beam LB is condensed onto a micro-focus spot by the lens 31, and radiated to a cutting portion (part under fusing by radiation of the laser beam LB) C under a state in which a focal position FP is focused on an upper surface of the glass sheet G. Then, the glass sheet G is fused with irradiation heat of the laser beam LB along the preset cutting line CL, and divided into a product portion Ga to be used as a product and a non-product portion Gb to be, for example, disposed of without being used as a product. Note that, the focal position FP of the laser beam LB may be an intermediate position in a thickness direction of the glass sheet G. Further, the focal position FP of the laser beam LB may be set above the glass sheet G so that the laser beam LB is radiated in a defocus state to the cutting portion C.

The glass sheet cutting device 1 further comprises a side assist gas jet nozzle 4 for jetting a side assist gas A1 obliquely downward from an upper position on the product portion Ga side to the cutting portion C. This side assist gas A1 functions to blow off a molten foreign matter such as dross to the non-product portion Gb side.

Description is made of an operation of the glass sheet cutting device 1 structured as described above.

As illustrated in FIGS. 1 and 2, the glass sheet G is conveyed by the conveyer 22 of the support stage 2, and is scanned along the preset cutting line CL of the glass sheet G with the laser beam LB radiated from the laser irradiator 3 arranged statically on a conveyance path.

While radiating the laser beam LB in this way, as illustrated in FIG. 3, the side assist gas A1 is jetted from the side assist gas jet nozzle 4 arranged on the upper position on the product portion Ga side of the glass sheet G obliquely downward to the cutting portion C positioned on the preset cutting line CL on the glass sheet G. With this, the molten foreign matter is removed from the cutting portion C, and hence fusing is efficiently performed. Further, the molten foreign matter is blown off to the non-product portion Gb side, and hence a situation where the molten foreign matter adheres to the product portion Ga can be prevented. The term "molten foreign matter" represents a foreign matter such as dross generated at the time of fusing of the glass sheet G, and includes a molten foreign matter and a solidified foreign matter.

Further, in a space above the glass sheet G, only the side assist gas jet nozzle 4 is provided as means for jetting a gas to the glass sheet G. The side assist gas jet nozzle 4 jets the side assist gas A1 obliquely with respect to the cutting portion C of the glass sheet G. Thus, in comparison with a case where a gas is jetted substantially vertically from just above with respect to the cutting portion C of the glass sheet G (for example, in a case where a center assist gas is jetted), a force of pressing downward a vicinity of the cutting portion C in a molten state is less liable to act. Thus, the vicinity of the cutting portion C in a molten state of the glass sheet G can be prevented from hanging downward. Then, under a state in which the cutting portion C is prevented from hanging, the molten foreign matter generated at the cutting portion C is scattered by the side assist gas A1 preferentially to the non-product portion Gb side. Thus, the molten foreign matter is less liable to be deposited on a fused end surface Ga1 of the product portion Ga.

Further, when the glass sheet G is fused as described above, a part of the cutting portion C of the glass sheet G is molten and removed, with the result that a gap is formed between the fused end surface Ga1 of the product portion Ga and a fused end surface Gb1 of the non-product portion Gb. Thus, the fused end surface Ga1 of the product portion Ga and the fused end surface Gb1 of the non-product portion Gb are spaced apart from each other by an amount corresponding to the gap. As a result, while preventing a situation where the fused end surfaces Ga1 and Gb1 are broken by contacting against each other, the product portion Ga and the non-product portion Gb can be smoothly separated from each other.

Figure 4:
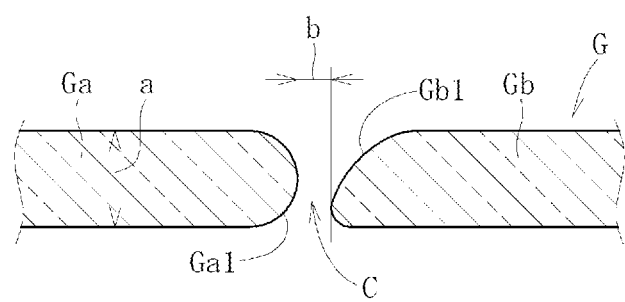
FIG. 4 A schematic view illustrating a state immediately after a glass substrate is fused by the glass sheet cutting device according to the first embodiment.

Specifically, as illustrated in FIG. 4, management is performed so as to form, by fusing, a narrowest gap b which satisfies a relationship of $0.1 \leq b/a \leq 2$, where "a" is the thickness of the glass sheet G and "b" is a narrowest gap between the fused end surface Ga1 of the product portion Ga and the fused end surface Gb1 of the non-product portion Gb after fusing. With this, the gap between the fused end surface Ga1 of the product portion Ga and the fused end surface Gb1 of the non-product portion Gb is strictly managed based on the relationship relative to the thickness of the glass sheet G. Thus, the product portion Ga and the non-product portion Gb can be safely separated from each other while satisfactorily maintaining a shape of the vicinity of the fused end surface Ga1 of the product portion Ga. In other words, when b/a exceeds 2, an excessively large amount of the glass sheet G is molten and removed by fusing, and the fused end surface Gb1 of the non-product portion Gb may be defectively shaped. Further, the glass sheet G may be deformed or broken by distortion. Meanwhile, when b/a is less than 0.1, the fused end surfaces Ga1 and Gb1 come excessively close to each other, and hence the fused end surfaces Ga1 and Gb1 may be brought into contact with each other at the time of separation, which may cause breakage of the product portion Ga (or non-product portion Gb).

As a countermeasure, in order to adjust a width of the narrowest gap b, the following fused conditions may be changed.

(1) Output power of the laser beam LB (2) A spot diameter size with respect to the glass sheet G (3) An inclination angle α1 (refer to FIG. 3) of an imaginary centerline L1 of the side assist gas A1 with respect to the surface (upper surface) of the glass sheet G (4) Jetting pressures of gases supplied to the glass sheet G, such as the side assist gas A1

(5) Pulse duration and a pattern of the laser beam

Conditions of the laser beam LB and the side assist gas A1 are as follows. Note that, as a matter of course, those conditions of the laser beam LB and the side assist gas A1 are not limited thereto.

The spot diameter of the laser beam LB is set to be smaller than the narrowest gap b in FIG. 4.

Irradiation energy of the laser beam LB on the upper surface of the glass sheet G is set to range from 100 W/mm² to 100,000 W/mm².

The jetting pressure of the side assist gas A1 is set to range from 0.01 MPa to 0.5 MPa.

The inclination angle α1 of the side assist gas A1 is set to range preferably from 25° to 60°, more preferably from 30° to 50°, and much more preferably from 35° to 45°. In other words, when the inclination angle of the side assist gas A1 with respect to the front surface of the glass sheet G is less than 25°, the side assist gas A1 is jetted at an excessively low angle with respect to the glass sheet G, which may cause a problem that the side assist gas A1 cannot be efficiently supplied to the cutting portion C. Meanwhile, when the inclination angle of the side assist gas A1 with respect to the front surface of the glass sheet G exceeds 60°, the side assist gas A1 is jetted at an excessively high angle with respect to the glass sheet G, which leads to a risk that a force of pressing the vicinity of the cutting portion C downward becomes larger. Thus, it is preferred that the inclination angle α1 of the side assist gas A1 fall within the above-mentioned numerical ranges. Within those ranges, the force of the side assist gas A1, with which the vicinity of the cutting portion C is pressed downward, can be appropriately suppressed while the side assist gas A1 is supplied sufficiently to the cutting portion C.

Note that, in terms of preventing adhesion of a molten foreign matter to the product portion Ga, it is preferred that the inclination angle α1 of the side assist gas A1 be set to range from 15° to 45°. Thus, in consideration of the shape of the fused end surface Ga1 of the product portion Ga and prevention of adhesion of a molten foreign matter to the product portion Ga, it is preferred that the inclination angle α1 of the side assist gas A1 be set to range from 25° to 45°.

An orientation of the side assist gas A1 is not particularly limited as long as being directed to the vicinity of the cutting portion C. For example, in the illustration, the imaginary center line L1 of the side assist gas A1 is set to intersect with the cutting portion C, but the imaginary center line L1 may be set to intersect with the upper surface or the lower surface of the glass sheet G on the product portion Ga side with respect to the cutting portion C.

Examples of the side assist gas A1 comprise individual ones or mixtures of gases of oxygen (or air), water vapor, carbon dioxide, nitrogen, argon, and the like. Further, the side assist gas A1 may be jetted as hot blast.

The glass sheet G fused as described above has the following features.

First, as illustrated in FIG. 4, the fused end surface Ga1 of the product portion Ga is formed into a substantially circular-arc shape, specifically, satisfactory convex curved-surface shape. In detail, the fused end surface Ga1 of the product portion Ga comprises a fire-polished surface. Note that, the fused end surface Gb1 of the non-product portion Gb may undergo adhesion of a molten foreign matter (such as dross) blown off by the side assist gas A1, with the result that the fused end surface Gb1 may not be formed into the substantially circular-arc shape.

Second, an arithmetic mean roughness Ra of the fused end surface Ga1 of the product portion Ga is 0.3 μm or less, and a mean length RSm of a roughness curve element thereof is 150 μm or more. In this context, regarding a lower limit value of Ra and an upper limit value of RSm, it is desired that the lower limit value of Ra be as close to zero as possible and that the upper limit value of RSm be as close to infinity as possible. However, practically, there are limitations owing to processing equipment and the like, and hence it is insignificant to define the lower limit value of Ra and the upper limit value of RSm. Therefore, in the above description, none of the lower limit value of Ra and the upper limit value of RSm is set.

Third, a compressive residual stress of the fused end surface Ga1 of the product portion Ga ranges from 20 MPa to 500 MPa.

(2) Second Embodiment

Figure 5:
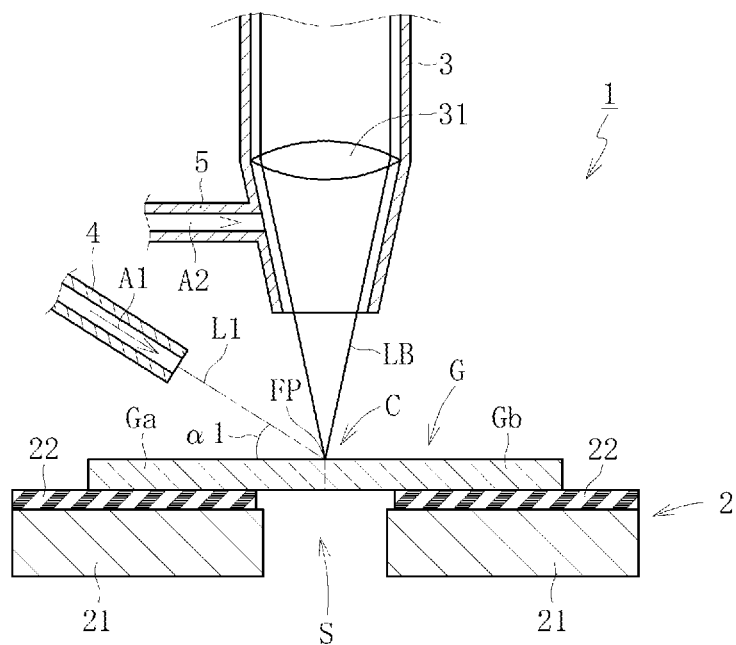
FIG. 5 A vertical sectional view of a glass sheet cutting device according to a second embodiment of the first invention.

As illustrated in FIG. 5, the glass sheet cutting device 1 according to a second embodiment of the first invention is obtained by adding a center assist gas jet nozzle 5 to the structure of the glass sheet cutting device 1 according to the first embodiment. In the following, description is made only of differences while omitting description of common features.

The center assist gas jet nozzle 5 is connected to a distal end portion of the laser irradiator 3, and supplies a center assist gas A2 into the interior space of the laser irradiator 3 (space below the lens 31). The center assist gas A2 supplied into the interior space of the laser irradiator 3 is jetted just below from a distal end of the laser irradiator 3 to the cutting portion C of the glass sheet G. In other words, from the distal end of the laser irradiator 3, the laser beam LB is emitted and the center assist gas A2 is jetted. The center assist gas A2 has functions to remove the molten foreign matter generated at the time of fusing the glass sheet G from the cutting portion C of the glass sheet G, to protect optical components such as the lens 31 of the laser irradiator 3 from the molten foreign matter, and further to reduce heat of the lens.

On a premise that the jetting pressure of the side assist gas A1 is P1 and the jetting pressure of the center assist gas A2 is P2, P2/P1 is set to range from 0 to 2. In detail, for example, the jetting pressure of the center assist gas A2 is set to range from 0 MPa to 0.02 MPa, and the jetting pressure of the side assist gas A1 is set to range from 0.01 MPa to 0.5 MPa. It is preferred to set the jetting pressure of the side assist gas A1 to be higher than the jetting pressure of the center assist gas A2. For example, P2/P1 is set to range from 0.1 to 0.5, and in this case, it is preferred to set the jetting pressure of the center assist gas A2 to be sufficient for protection of the optical components such as the lens 31 of the laser irradiator 3 from the molten foreign matter.

With this, the jetting pressure of the center assist gas A2 is relatively weakened, and hence mainly the side assist gas A1 blows off the molten foreign matter generated at the cutting portion C. This side assist gas A1 is jetted obliquely downward from the upper position on the product portion Ga side to the cutting portion C, and hence the force of pressing downward the vicinity of the cutting portion C in the molten state of the glass sheet G is weaker than that of the center assist gas A2. Therefore, by setting the jetting pressure of the side assist gas A1 to be higher than the jetting pressure of the center assist gas A2, the cutting portion C in the molten state of the glass sheet G can be prevented from hanging. Then, under the state in which the cutting portion C is prevented from hanging in this way, the molten foreign matter generated at the cutting portion C is scattered by the side assist gas A1 preferentially to the non-product portion Gb side. Thus, the molten foreign matter is less liable to be deposited on the fused end surface Ga1 of the product portion Ga. In this way, as in the case illustrated in FIG. 4, the fused end surface Ga1 of the product portion Ga can be maintained in the satisfactory substantially circular-arc shape.

The side assist gas A1 and the center assist gas A2 may be of the same type or of types different from each other.

(3) Third Embodiment

Figure 6:
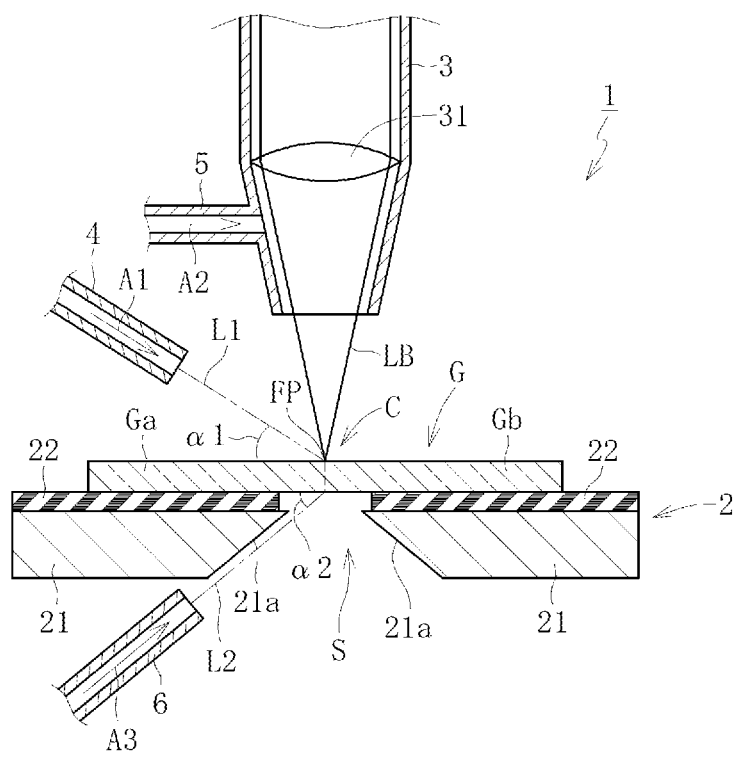
FIG. 6 A vertical sectional view of a glass sheet cutting device according to a third embodiment of the first invention.

As illustrated in FIG. 6, the glass sheet cutting device 1 according to a third embodiment of the first invention is different from the glass sheet cutting devices 1 according to the first and second embodiments in that an auxiliary side assist gas jet nozzle 6 is provided in a space below the glass sheet G. In the following, description is made only of the difference while omitting description of common features. Note that, the center assist gas jet nozzle 5 is provided in the illustration, but may be omitted.

The auxiliary side assist gas jet nozzle 6 is arranged at a lower position on the product portion Ga side of the glass sheet G, and jets an auxiliary side assist gas A3 obliquely upward to the cutting portion C.

Further, in this embodiment, a side surface portion 21a on the product portion Ga side of the stage main body 21, which faces the non-support space S, is formed as a tapered surface inclined to be closer on an upper side to the cutting portion C of the glass sheet G than on a lower side. The side surface portion 21a formed as the tapered surface guides obliquely upward the auxiliary side assist gas A3 jetted from the auxiliary side assist gas jet nozzle 6 so that the auxiliary side assist gas A3 is supplied to the cutting portion C of the glass sheet G. Note that, in the illustration, another side surface portion 21a on the non-product portion Gb side of the stage main body 21, which faces the non-support space S, is also formed as a tapered surface inclined to be closer on an upper side to the cutting portion C of the glass sheet G than on a lower side. As a matter of course, only the side surface portion 21a on the product portion Ga side of the stage main body 21 may be formed as the tapered surface.

With this, the molten foreign matter generated at the cutting portion C of the glass sheet G can be efficiently blown off by the side assist gas A1 and the side assist gas A3 toward the non-product portion Gb side. Further, the auxiliary side assist gas A3 acts on the lower surface of the glass sheet G, and hence an effect of supporting the vicinity of the cutting portion C of the glass sheet G from below can be expected, which is conceived to contribute to prevention of hanging of the vicinity of the cutting portion C.

The jetting pressure of the auxiliary side assist gas A3 is set to range from, for example, 0.01 MPa to 0.5 MPa.

An inclination angle $\alpha 2$ of the auxiliary side assist gas A3 with respect to the rear surface (lower surface) of the glass sheet G is set to range preferably from 15° to 70°, more preferably from 20° to 60°, and much more preferably from 25° to 45°.

An orientation of the auxiliary side assist gas A3 is not particularly limited as long as being directed to the vicinity of the cutting portion C. For example, in the illustration, an imaginary center line L2 of the auxiliary side assist gas A3 is set to intersect with the cutting portion C, but the imaginary center line L2 may be set to intersect with the upper surface or the lower surface of the glass sheet G on the product portion Ga side with respect to the cutting portion C.

The auxiliary side assist gas A3 may be of the same type as or of a type different from that of the side assist gas A1.

Note that, in this third embodiment, the side assist gas A1 and the auxiliary side assist gas A3 are jetted simultaneously to the cutting portion C of the glass sheet G, but the present invention is not limited thereto. For example, jetting of the side assist gas A1 may be continued to blow off the molten foreign matter at the cutting portion C until the cutting portion C of the glass sheet G is penetrated, and after the cutting portion C of the glass sheet G is penetrated, jetting of the side assist gas A1 may be stopped so that the molten foreign matter at the cutting portion C is blown off with the auxiliary side assist gas A3.

(4) Fourth Embodiment

Figure 7:
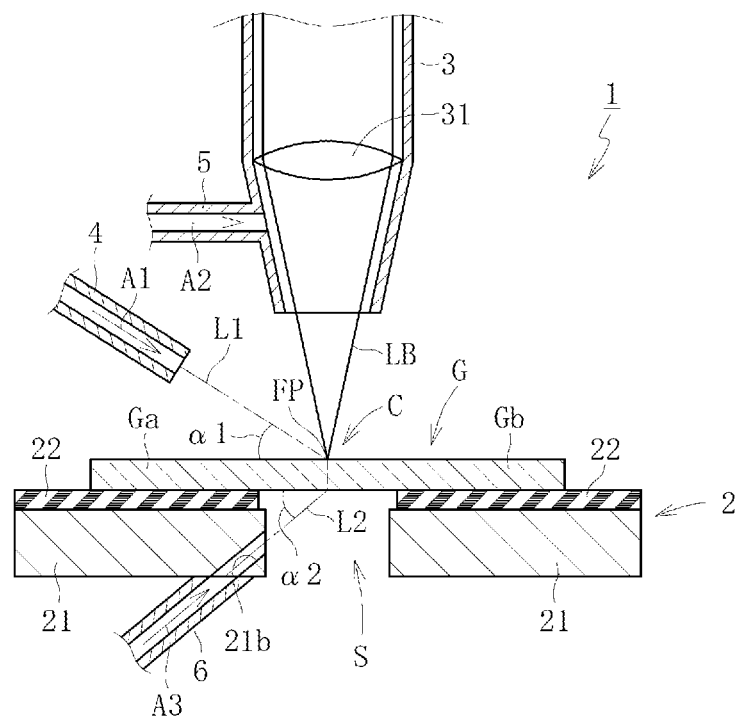
FIG. 7 A vertical sectional view of a glass sheet cutting device according to a fourth embodiment of the first invention.

As illustrated in FIG. 7, the glass sheet cutting device 1 according to a fourth embodiment of the first invention is different from the glass sheet cutting device 1 according to the third embodiment in how to supply the auxiliary side assist gas A3. In the following, description is made only of the difference while omitting description of common features.

In the fourth embodiment, the stage main body 21 of the support stage 2 comprises a gas flow path 21b extending obliquely upward and having one end communicated to the non-support space S. Another end of the gas flow path 21b is connected to a jet port of the auxiliary side assist gas jet nozzle 6. The auxiliary side assist gas A3 jetted from the auxiliary side assist gas jet nozzle 6 is guided obliquely upward through the gas flow path 21b and discharged into the non-support space S. In this way, the auxiliary side assist gas A3 is supplied to the cutting portion C of the glass sheet G.

(5) Fifth Embodiment

Figure 8:
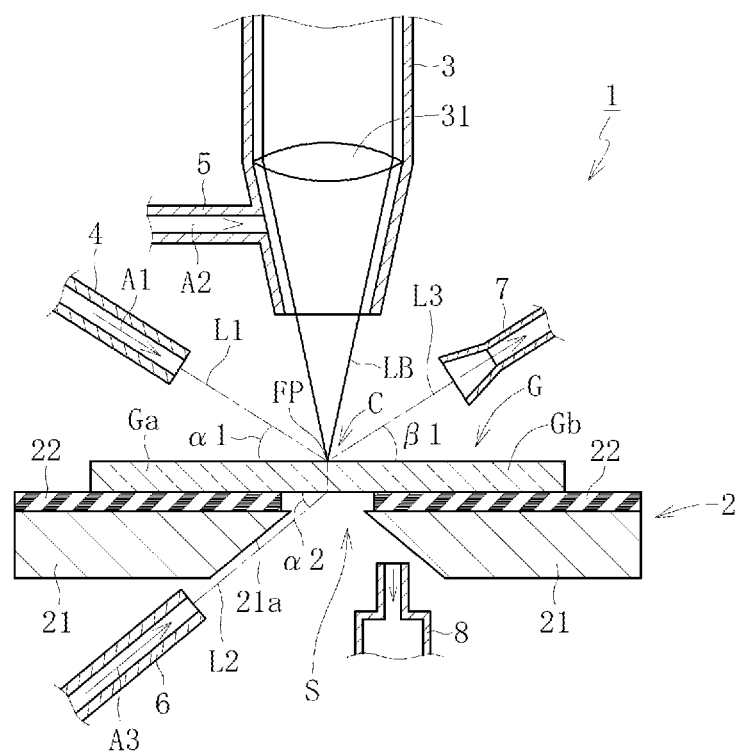
FIG. 8 A vertical sectional view of a glass sheet cutting device according to a fifth embodiment of the first invention.

As illustrated in FIG. 8, the glass sheet cutting device 1 according to a fifth embodiment of the first invention is different from the glass sheet cutting device 1 according to the third embodiment in that there is provided a configuration for sucking the molten foreign matter generated in the fusing process. In the following, description is made only of the difference while omitting description of common features.

Specifically, the glass sheet cutting device 1 according to the fifth embodiment comprises a first suction nozzle 7 arranged at an upper position on the non-product portion Gb side and a second suction nozzle 8 arranged at a lower position on the non-product portion Gb side.

The first suction nozzle 7 is arranged to face the side assist gas jet nozzle 4 under a state in which an imaginary center line L3 thereof is orientated to the cutting portion C, and sucks the molten foreign matter in the space above the glass sheet G. An inclination angle $\beta 1$ of the imaginary center line L3 of the first suction nozzle 7 with respect to the front surface (upper surface) of the glass sheet G is set within a range of $\alpha 1 \pm 15°$, preferably $\alpha 1 \pm 10°$, and more preferably $\alpha 1 \pm 5°$.

Meanwhile, the second suction nozzle 8 is arranged to face the auxiliary side assist gas jet nozzle 6 under a state in which a suction port thereof is oriented upward, and sucks the molten foreign matter in the space below the glass sheet G, in other words, the non-support space S. The second suction nozzle 8 is arranged relatively on the non-product portion Gb side with respect to just below the cutting portion C. This is because, in the non-support space S, the molten foreign matter descends while being blown off by the side assist gas A1 and the auxiliary side assist gas A3 toward the non-product portion Gb side.

The first suction nozzle 7 and the second suction nozzle 8 suck the molten foreign matter blown off by the side assist gas A1 and the auxiliary side assist gas A3 toward the non-product portion Gb side. With this, it is possible to reliably prevent a situation where the molten foreign matter blown off from the cutting portion C by the side assist gas A1 and the auxiliary side assist gas A3 floats in an ambient space and re-adhere to the product portion Ga.

Note that, in this fifth embodiment, the first suction nozzle 7 and the second suction nozzle 8 suck the molten foreign matter simultaneously, but the present invention is not limited thereto. For example, suction of the molten foreign matter with the first suction nozzle 7 may be continued until the cutting portion C of the glass sheet G is penetrated, and after the cutting portion C of the glass sheet G is penetrated, the molten foreign matter may be sucked with the second suction nozzle 8. Alternatively, the first suction nozzle 7 may be omitted so that the molten foreign matter is sucked only with the second suction nozzle 8.

Figure 9:
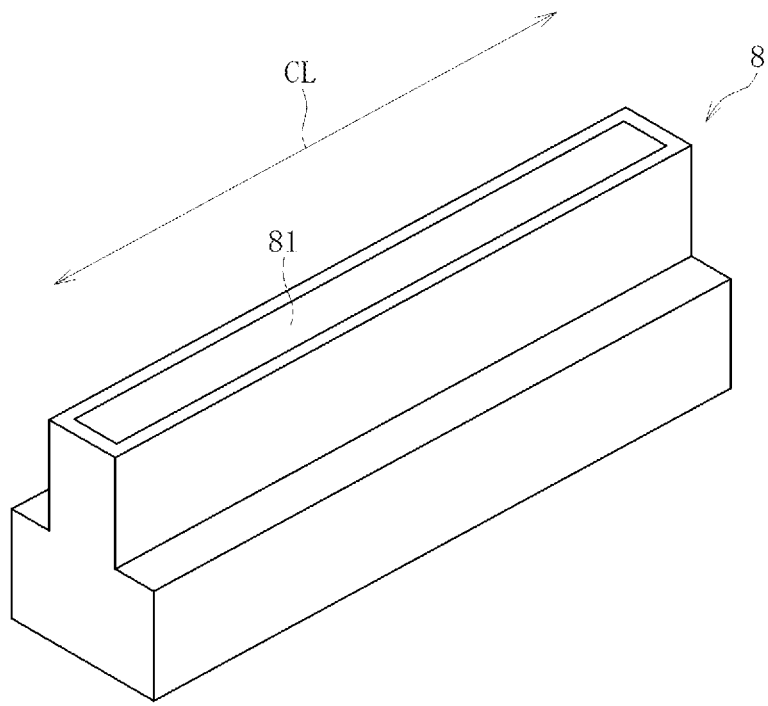
FIG. 9 A perspective view of a second suction nozzle of FIG. 8.

As illustrated in FIG. 9, the second suction nozzle 8 arranged in the space below the glass sheet G comprises a suction port 81, which is elongated along a direction of the preset cutting line CL of the glass sheet G. This is because, in the space below the glass sheet G, the molten foreign matter tends to scatter over a wide range along the direction of the preset cutting line CL. Note that, when there is no spatial restriction due to the laser irradiator 3 and the like, the first suction nozzle 7 arranged in the space above the glass sheet G may also comprise a suction port elongated along the extending direction of the preset cutting line CL.

(6) Sixth Embodiment

Figure 10:
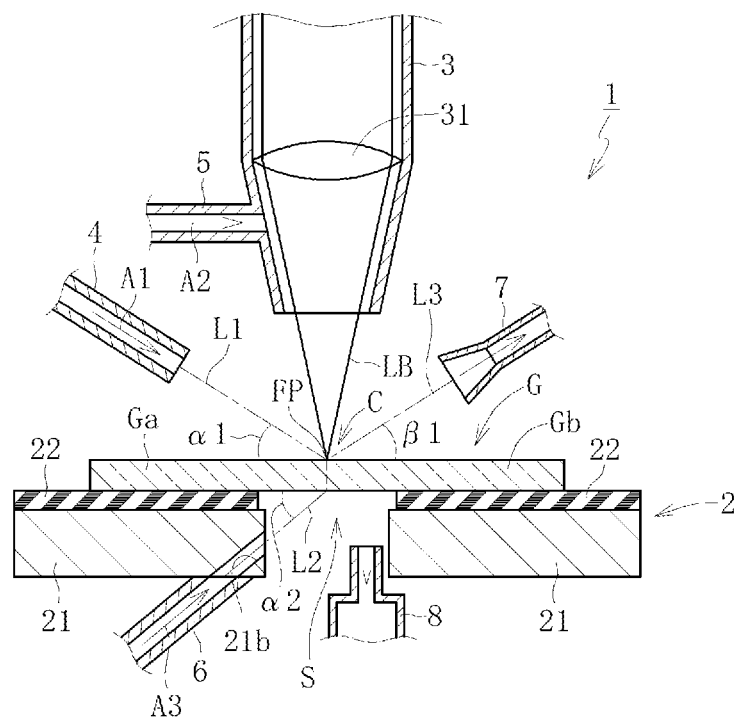
FIG. 10 A vertical sectional view of a glass sheet cutting device according to a sixth embodiment of the first invention.

As a matter of course, as illustrated in FIG. 10, the glass sheet cutting device 1 according to the fourth embodiment (refer to FIG. 7) may further comprise the first suction nozzle 7 and the second suction nozzle 8.

Figure 11:
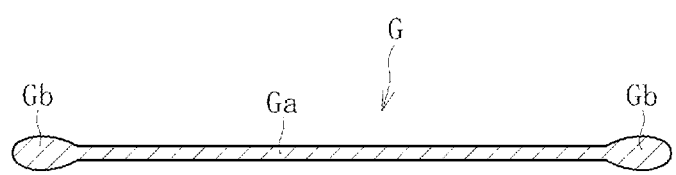
FIG. 11 A view illustrating another example of a glass sheet to be fused in the first invention.

Note that, the first invention is not limited to the above-mentioned first to sixth embodiments, and various modifications may be made thereto. For example, when the glass sheet G is formed by an overflow downdraw method or the like, as illustrated in FIG. 11, a thickness of both the widthwise end portions of the glass sheet G is relatively larger than a thickness of a widthwise central portion of the glass sheet G. The widthwise central portion is produced as the product portion Ga, and both the widthwise end portions are each produced as the non-product portion (referred to as ear portions) Gb. Thus, the cutting methods and the cutting devices according to the present invention may be utilized for removing such ear portions each produced as the non-product portion Gb of the glass sheet G.

Further, in the above-mentioned embodiments, description is made of a case where one of the thin flat glass G separated by fusing is the product portion Ga, and another is the non-product portion Gb. However, the cutting method and the cutting device according to the present invention are applicable to a case where both the one and the another of the thin flat glass G are produced as the product portions Ga.

Example 1

As Examples of the first invention, the following comparative tests were carried out. Testing conditions are as follows. First, as in the embodiment illustrated in FIG. 3, while blowing an assist gas, a $CO_2$ laser beam with a wavelength of 10.6 μm is radiated to a cutting portion of a thin flat glass having a size of 300 mm long and 300 mm wide so that the thin flat glass is cut by fusing. Next, annealing treatment is performed through a secondary process (such as laser annealing or electric heating annealing) performed on a vicinity of a fused end surface of the thin flat glass thus fused. Such a series of cutting steps is performed while changing the thickness a of the thin flat glass and the narrowest gap b between the fused end surfaces. Then, the following were inspected with respect to each of the thin flat glasses fused through the cutting steps.

Figure 12:
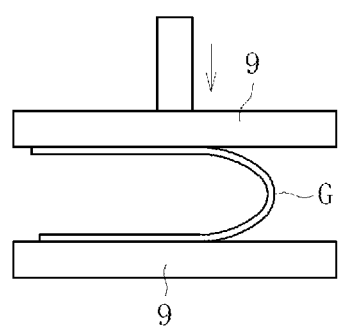
FIG. 12 A view illustrating a state in which strength of the glass sheet is evaluated in Examples of the first invention.

(1) Abrasion conditions of the fused end surfaces
(2) Shapes of the fused end surfaces
(3) Strengths Note that, the strengths of the fused thin flat glasses were evaluated, as illustrated in FIG. 12, by two-point bending of sequentially sandwiching the thin flat glasses G between two plate-like bodies 9 and gradually bending the thin flat glasses G into a U-shape by pressing at a speed of 50 mm/minute so that the thin flat glass G is curved in a longitudinal direction. These evaluations are obtained by calculating breaking strengths based on an interval between the two plate-like bodies 9 at the time of breakage through bending by pressing. Results of those tests are shown below.

TABLE 1

|  | Comparative Example 1 | Example 1 | Example 2 | Example 3 | Example 4 | Example 5 | Comparative Example 2 |
|---|---|---|---|---|---|---|---|
| a [μm] | 100 | 100 | 100 | 100 | 100 | 100 | 100 |
| b [μm] | 5 | 10 | 50 | 70 | 100 | 200 | 220 |
| b/a | 0.05 | 0.1 | 0.5 | 0.7 | 1 | 2 | 2.2 |
| Abrasion | Observed | Somewhat observed | None | None | None | None | None |
| Shape | good | good | very good | very good | very good | good | bad |
| Strength [MPa] | 350 | 450 | 1,000 | 1,000 | 900 | 600 | 600 |
| Comprehensive evaluation | bad | good | very good | very good | very good | good | bad |

TABLE 2

|  | Example 6 | Example 7 | Example 8 | Example 9 | Example 10 | Comparative Example 3 |
|---|---|---|---|---|---|---|
| a [μm] | 100 | 200 | 300 | 400 | 500 | 700 |
| b [μm] | 50 | 50 | 50 | 50 | 50 | 50 |
| b/a | 0.5 | 0.25 | 0.17 | 0.13 | 0.1 | 0.07 |
| Abrasion | None | None | None | None | None | Observed |
| Shape | very good | very good | very good | good | good | Good |
| Strength [MPa] | 1,000 | 1,000 | 850 | 750 | 500 | 300 |
| Comprehensive evaluation | very good | very good | very good | very good | good | bad |

According to Tables 1 and 2 above, it can be understood that, when b/a is 0.1 or more, abrasion is not caused at all by contact between the fused end surfaces of the thin flat glass at the time of separation, or can be suppressed to a substantially ignorable level. Thus, when the thickness a and the narrowest gap b are managed to fall within such ranges, it is possible to reliably reduce a risk of breakage of the fused end surfaces of the thin flat glass by contact to each other at the time of separation.

Further, when b/a is 2 or less, it can be understood that the shapes of the fused end surfaces of the thin flat glass can be satisfactorily maintained. Thus, when the thickness a and the narrowest gap b are managed to fall within such ranges, it is possible to reliably reduce a risk of deterioration in product quality of the thin flat glass or a risk of breakage of the thin flat glass from the fused end surface in subsequent steps.

Therefore, when the narrowest gap b is managed so that a relationship of 0.1≤b/a≤2 is satisfied, it is possible to reliably reduce a risk of breakage of the thin flat glass at the time of separation or in steps subsequent thereto while satisfactorily maintaining the shape of the vicinity of the fused end surface of the thin flat glass. Note that, such functions and advantages can be obtained without necessity to perform preheating or annealing treatment in addition to radiation of a laser beam for fusing.

Note that, when more stable product quality is required, the annealing treatment may be performed with a laser beam and the like immediately after fusing.

An arithmetic mean roughness Ra of the fused end surfaces formed in Examples 8 to 10 above ranged from 0.08 μm to 0.18 μm, and a mean length RSm of a roughness curve element thereof ranged from 250 μm to 400 μm. Thus, residues on the fused end surfaces were easily removed. Meanwhile, as for cleaved end surfaces of thin flat glasses in Comparative Examples, each formed by folding and cleaving the thin flat glass along a scribe line and then being subjected to diamond polishing, an arithmetic mean roughness Ra of the cleaved end surfaces ranged from 0.4 μm to 0.6 μm, and a mean length RSm of a roughness curve element thereof ranged from 80 μm to 140 μm. Thus, residues on the cleaved end surfaces were not sufficiently removed.

Further, compression strains (residual compressive stresses) of the fused end surfaces formed in Examples 1 to 10 above ranged from 80 MPa to 180 MPa. When those end surfaces were each flawed to generate cracks, the cracks propagated along edges, with the result that performance of the glass sheet was not deteriorated. Meanwhile, compression strains of the end surfaces of the thin flat glasses prepared in Comparative Examples, which were subjected to laser cleaving, ranged from 0 MPa to 15 MPa. When those cleaved end surfaces were each flawed to generate cracks, the cracks propagated in an in-plane direction to divide the thin flat glass into two pieces, with the result that performance as the glass sheet was lost.

Embodiments of Second Invention

Embodiments of the second invention are in common with the first to sixth embodiments of the first embodiment described above, and hence description thereof is omitted.

Embodiments of Third Invention

Embodiments of the third invention are in common with the fifth and sixth embodiments of the first embodiment described above, and hence description thereof is omitted.

Embodiments of Fourth Invention

In the following, description is made of a laser fusing method according to an embodiment of the fourth invention with reference to the drawings.

Figure 13:
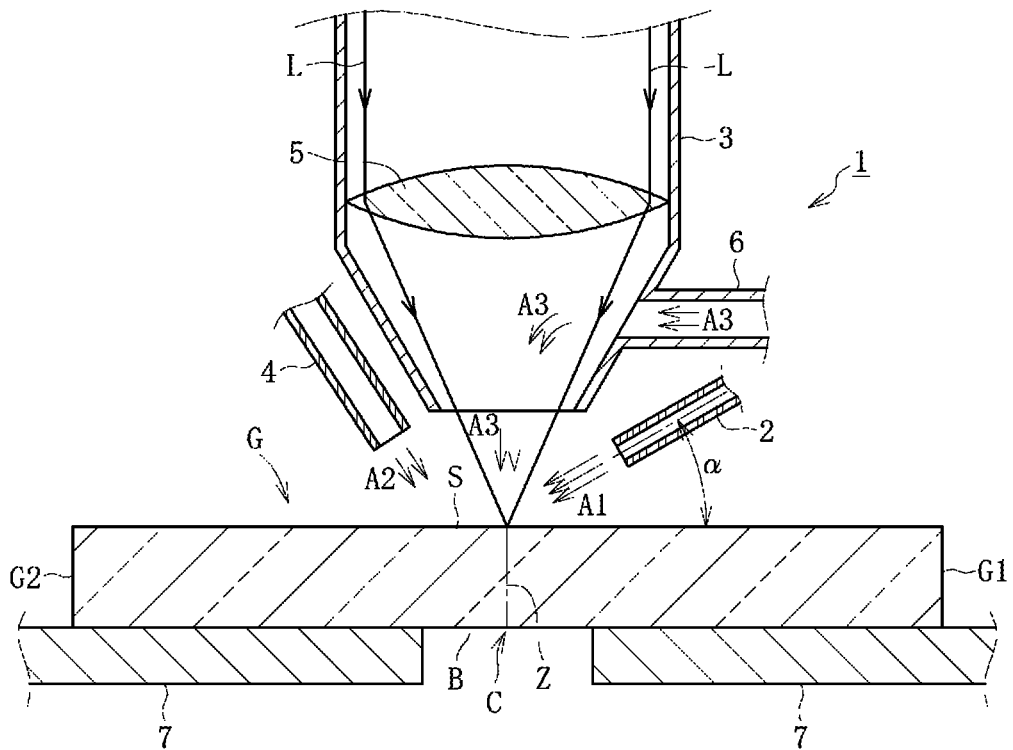
FIG. 13 A sectional view of a glass sheet cutting device used in a laser fusing method for a glass sheet according to an embodiment of a fourth invention.

FIG. 13 is a sectional view of a glass sheet cutting device 1 used for the laser fusing method according to the embodiment of the fourth invention. As illustrated in FIG. 13, the glass sheet cutting device 1 comprises an assist gas jet nozzle 2 for jetting an assist gas A1 in a direction inclined at a jetting angle α with respect to a front surface S of the glass sheet G while being oriented toward an irradiation portion C which is irradiated with a laser beam L, and a side assist gas jet nozzle 4 for jetting a side assist gas A2 in a direction inclined with respect to the front surface S of the glass sheet G while being oriented toward the irradiation portion C from an opposite side of the assist gas jet nozzle 2. Further, the laser irradiator 3 for radiating the laser beam L from just above to the irradiation portion C is arranged at a position facing the front surface S of the glass sheet G in the irradiation portion C, which is irradiated with the laser beam L.

The laser irradiator 3 comprises therein a condenser lens 5 for condensing the laser beam L generated from a laser oscillating device (not shown) and radiating the laser beam L to the irradiation portion C. A focal point of the condenser lens 5 is adjusted to be positioned on a line of an imaginary cutting line Z indicated in FIG. 13 and on an extension line thereof. Further, the laser irradiator 3 comprises a side wall provided with a center assist gas introducing path 6 for introducing a center assist gas A3, which is jetted from a radiation port of the laser irradiator 3 to the irradiation portion C, into the laser irradiator 3.

The glass sheet cutting device 1 structured as described above is configured to cut the glass sheet G placed on a support stage 7 by the laser fusing method using the irradiation portion C (imaginary cutting line Z) as a boundary into a product portion G1 on a side from which the assist gas A1 is jetted and a non-product portion G2 on a side to which the side assist gas A1 is jetted.

In this context, a jetting pressure of the side assist gas A2 is set to be lower than a jetting pressure of the assist gas A1 so that an effect that a molten glass portion M generated at the irradiation portion C is scattered by the assist gas A1 is not impaired. It is preferred that the jetting pressures of the assist gas A1, the side assist gas A2, and the center assist gas A3 range from 0.2 MPa to 0.6 MPa, 0.0 MPa to 0.3 MPa, and 0.0 MPa to 0.3 MPa, respectively. It is more preferred that the jetting pressures of the assist gas A1, the side assist gas A2, and the center assist gas A3 range from 0.3 MPa to 0.5 MPa, 0.0 MPa to 0.2 MPa, and 0.0 MPa to 0.2 MPa, respectively. In addition, examples of the assist gas A1, the side assist gas A2, and the center assist gas A3 include inert gases exemplified by oxygen, air, water vapor, nitrogen, carbon dioxide, and argon.

Further, the jetting angle α of the side assist gas A1 is selected based on a relationship between the sheet thickness of the glass sheet G and a clearance to be formed between cut surfaces of the glass sheet G after cutting. For example, when a ratio of the sheet thickness and the clearance formed after cutting is [0.1<(clearance/sheet thickness)<2.0], in order that the cut surfaces (cut surface of the product portion G1 and cut surface of the non-product portion G2) of the glass sheet G after cutting are prevented from contacting and sliding with respect to each other and that the molten glass is prevented from being unnecessarily scattered, the jetting angle α is set preferably within a range of 20°<α<65°, and more preferably 25°<α<60°. An optimum value of the ratio is adjusted with the sheet thickness.

As the glass sheet G to be cut by laser fusing, there may be employed sheets of non-alkali glass, soda-lime glass, borosilicate glass, lead glass, crystallized glass, physical tempered glass, chemical tempered glass, and the like. In any case, the thickness of such glass sheets is preferably 1.0 mm or less, and more preferably 0.5 mm or less, while a lower limit value of the thickness is set to 0.02 mm.

In the following, with reference to FIGS. 14 to 17 of the accompanying drawings, description is made of how to perform the laser fusing method according to the embodiment of the present invention for the glass sheet G, in which the glass sheet cutting device 1 described above is used. Note that, in the embodiment of the present invention, the non-alkali glass sheet is used as the glass sheet G, and a sheet thickness of the glass sheet G subjected to cutting is 0.5 mm, a ratio of the sheet thickness of the glass sheet G and a clearance formed between cut surfaces of the glass sheet G after cutting (clearance/sheet thickness) is 1.0, the jetting pressure of the assist gas A1 is 0.5 MPa, the jetting pressure of each of the side assist gas A2 and the center assist gas A3 is 0.1 MPa, and the jetting angle α is set to 35°.

Figure 14:
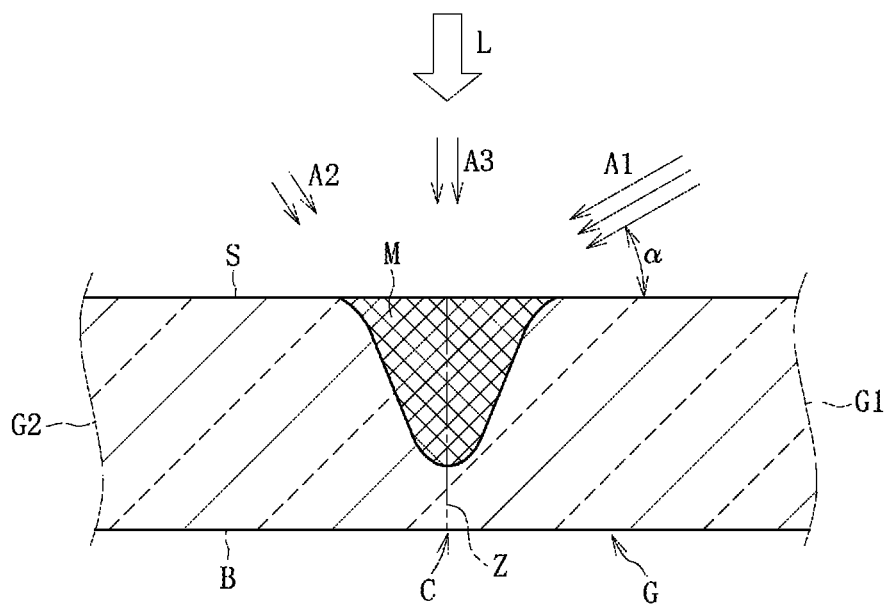
FIG. 14 A sectional view illustrating how laser fusing is performed by the glass sheet cutting device of FIG. 13.

As illustrated in FIG. 14, through radiation of the laser beam L to the irradiation portion C of the glass sheet G, the glass is molten at the irradiation portion C by irradiation heat of the laser beam L, with the result of being formed as the molten glass portion M indicated by cross-hatching in FIG. 14. At this time point, the assist gas A1, the side assist gas A2, and the center assist gas A3 have been jetted to the irradiation portion C (molten glass portion M).

Figure 15:
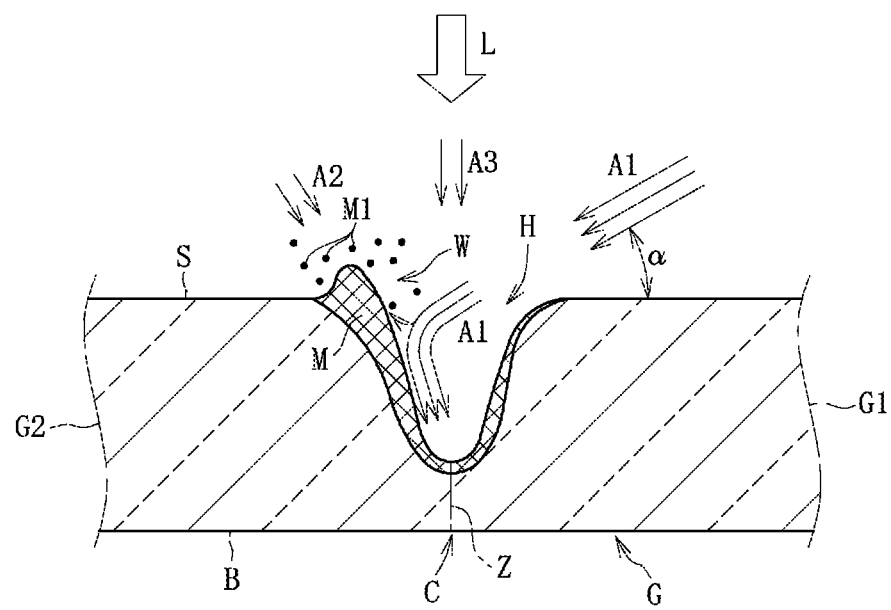
FIG. 15 Another sectional view illustrating how laser fusing is performed by the glass sheet cutting device of FIG. 13.

Through jetting of the above-mentioned gases, as illustrated in FIG. 15, apart on a front surface side of the molten glass portion M is thickened in a direction from the product portion G1 side to the non-product portion G2 side mainly by pressure of the assist gas A1, and another part of the molten glass portion M is scattered in the same direction. In this way, a recessed portion H is formed in the irradiation portion C. The part of the molten glass portion M is thickened as described above at a wall portion in the recessed portion H, with which the assist gas A1 collides, with the result that an inclined wall portion W inclined oppositely to the inclination α of the jetting direction of the assist gas A1 is formed.

By the inclined wall portion W thus formed, a jet flow of the assist gas A1 flowing in an oblique direction from the product portion G1 side to the non-product portion G2 side collides against the inclined wall portion W, and hence is turned in a vicinity of a central portion in a thickness direction of the irradiation portion C. Then, along the inclined wall portion W, the jet flow is turned from the non-product portion G2 side toward the product portion G1 side. In this way, the jet flow is guided to a back surface B side of the glass sheet G. At this time point, as illustrated in FIG. 15, an upper end of the inclined wall portion W is in a state of swelling from the front surface S of the glass sheet G, and hence the assist gas A1 is more easily guided to the back surface B side.

In this way, the side assist gas A2 functions to prevent unnecessary scattering of the molten glass portion M with pressure thereof, and to support formation of the inclined wall portion W by cooling the wall portion in the recessed portion H, with which the assist gas A1 collides, so as to promote re-solidification of the molten glass portion M existing at the wall portion. Further, the jetting pressure of the side assist gas A2 is lower than the jetting pressure of the assist gas A1, and hence an effect of scattering the molten glass portion M with the assist gas A1 is not impaired.

Further, at this time, the center assist gas A3 supports an effect of scattering the molten glass portion M with the assist gas A1 and functions as an air curtain for preventing partially volatilized molten particles M1 from scattering and adhering as dross to the above-mentioned condenser lens 5. Further, with respect to the recessed portion H formed in the irradiation portion C, the center assist gas A3 functions also to support, together with the side assist gas A2, the formation of the inclined wall portion W by cooling the wall portion, with which the assist gas A1 collides, so as to promote the re-solidification of the molten glass portion M existing at the wall portion.

Figure 16:
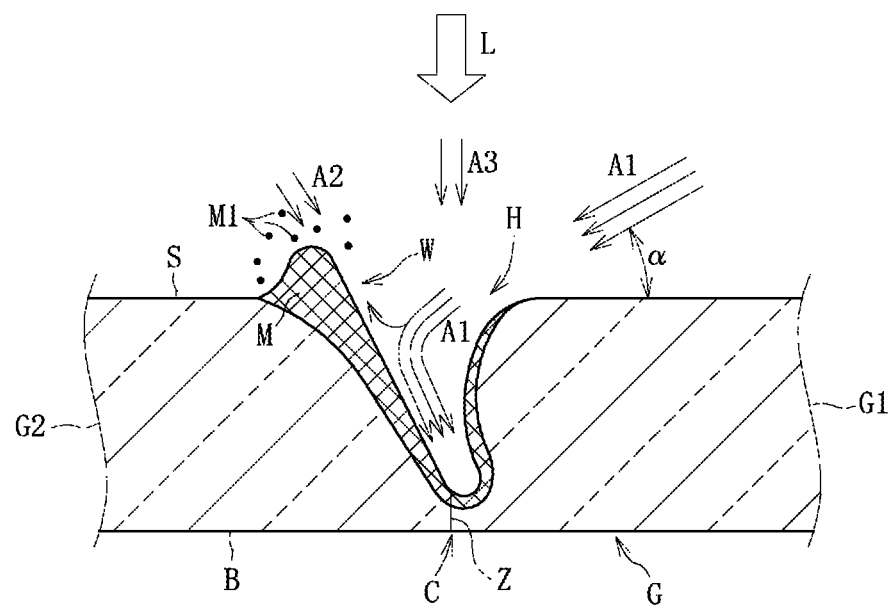
FIG. 16 Still another sectional view illustrating how laser fusing is performed by the glass sheet cutting device of FIG. 13.

As described above, the wall portion of the recessed portion H, with which the assist gas A1 collides, is formed as the inclined wall portion W. Thus, as illustrated in FIG. 16, a part of the jet flow of the assist gas A1 is changed into flow turned in the vicinity of the central portion in the thickness direction of the irradiation portion C. By the flow and pressure of such an assist gas A1, the part of the molten glass portion M, which is molten and softened by the irradiation heat of the laser beam L, is gradually removed. In this way, cutting of the glass sheet G proceeds.

Figure 17:
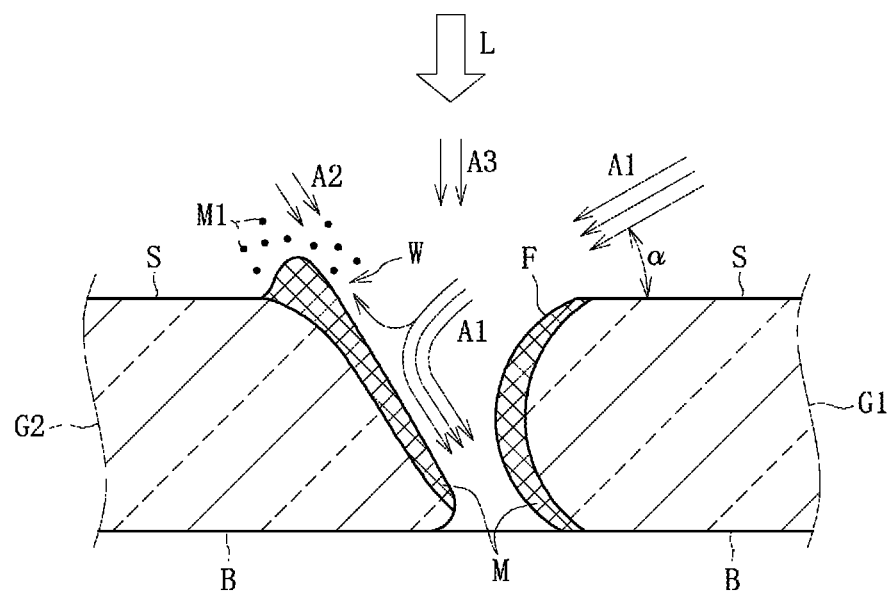
FIG. 17 Yet another sectional view illustrating how laser fusing is performed by the glass sheet cutting device of FIG. 13.
Figure 18:
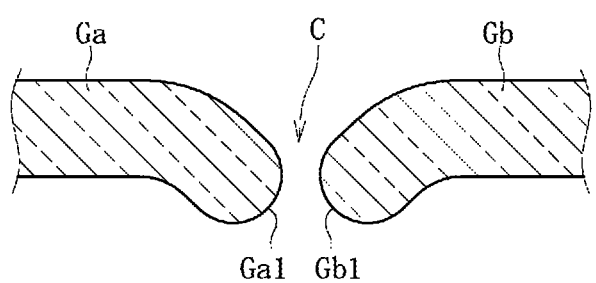
FIG. 18 A view illustrating a problem that may occur in a case where a glass sheet is cut by laser fusing.

After cutting of the glass sheet G is completed by continuously performing such an operation, as illustrated in FIG. 17, a cut surface F of the product portion G1 after cutting is formed as a cut surface F having a convex curved-surface shape substantially symmetrical with each other with respect to a central portion in the thickness direction. This cut surface F does not comprise corner portions liable to be subjected to chipping and the like. Thus, it is no longer necessary to perform a polishing process on the cut surface F after cutting. In addition, the assist gas A1 is jetted obliquely to the front surface S of the glass sheet G, and is turned in a midway so as to be discharged obliquely to the back surface B. In this way, it is also possible to avoid troubles in a case where the assist gas A1 is jetted perpendicularly to the front surface S of the glass sheet G, specifically, a trouble that a part of the molten glass portion M hangs from the back surface B by strong pressing of the irradiation portion C with the jetting pressure of the assist gas A1. As a result, an advantage of enhancing product quality of the cut surface F can be obtained.

In the embodiment of the fourth invention, a total of three gases: the side assist gas A1; the side assist gas A2; and the center assist gas A3 are used. However, it is not necessary to use the side assist gas A2 and the center assist gas A3, and only the assist gas A1 may be used. Further, in the embodiment of the present invention, the side assist gas A2 is ceaselessly jetted from the start to the end of cutting of the glass sheet G. However, the side assist gas A2 may be jetted after the inclined wall portion W starts to be formed in the irradiation portion C. Further, the laser beam L is radiated to the irradiation portion C from just above. However, the laser irradiator 3 may be provided separately from the jetting port of the center assist gas A3 so that the laser beam is radiated from the product portion G1 side or the non-product portion G2 side. Further, it is not necessary to position the focal point of the laser beam L with respect to an intersecting portion between the imaginary cutting line Z and the front surface S of the glass sheet G, and the focal point of the laser beam L may be adjusted to be positioned on the central portion in the thickness direction of the irradiation portion C, on the back surface B, or above the front surface S of the glass sheet G.

Example 2

As Examples of the fourth invention, tests of cutting glass sheets by the laser fusing method were carried out under six conditions shown in Table 3 below (four Examples and two Comparative Examples). After that, as quality evaluations of cut surfaces of products, quality levels were compared to each other based on the following three items. Note that, the $CO_2$ laser beam with a wavelength of 10.6 μm was used as a laser beam for fusing.

Item 1: whether or not dross adheres to any of the cut surfaces of the products

Item 2: whether or not a melt hangs from any of the cut surfaces of the products Item 3: quality level of symmetry in the thickness direction of each of the cut surfaces of the products Table 3 below shows the test results. Note that, in Table 3, in rows of "jetting pressure of assist gas" and "jetting pressure of side assist gas," cells of "0.0 MPa" mean that none of the assist gas and the side assist gas was jetted.

TABLE 3

|  | Example 1 | Example 2 | Example 3 | Example 4 | Comparative Example 1 | Comparative Example 2 |
| --- | --- | --- | --- | --- | --- | --- |
| Type of glass | Non-alkali | Non-alkali | Non-alkali | Soda-lime | Non-alkali | Soda-lime |
| Sheet thickness of glass [mm] | 0.1 | 0.3 | 0.5 | 1 | 0.1 | 1 |
| Clearance /sheet thickness | 0.5 | 1 | 1 | 1.5 | 1 | 1 |
| Jetting pressure of assist gas [MPa] | 0.3 | 0.4 | 0.5 | 0.5 | 0 | 0.1 |
| Jetting angle of assist gas [°] | 43 | 35 | 35 | 28 |  | 85 |
| Jetting pressure of center assist gas [MPa] | 0.1 | 0.1 | 0.1 | 0.1 | 0.3 | 0.5 |
| Jetting pressure of side assist gas [MPa] | 0 | 0 | 0.1 | 0.1 | 0 | 0 |
| 1. Whether or not dross adhesion was observed | None | None | None | None | Observed | Observed |
| 2. Whether or not hanging occurred | None | None | None | None | Observed | Observed |

TABLE 3-continued

|  | Example 1 | Example 2 | Example 3 | Example 4 | Comparative Example 1 | Comparative Example 2 |
|---|---|---|---|---|---|---|
| 3. Quality level of symmetry of cut surface | good | good | good | good | bad | bad |

As shown in Table 3, when the assist gas was not used as in Comparative Example 1, adhesion of dross to the cut surfaces of the products was observed, and the inclined wall portion was not formed in the non-product portions. In addition, hanging of the molten glass was confirmed. Further, as in Comparative Example 2, also when the center assist gas was mainly used while jetting the side assist gas from substantially just above the irradiation portion, the inclined wall portion was not formed in the non-product portion, and satisfactory results were not obtained with regard to any of the comparison items. Meanwhile, in Examples 1 to 4, adhesion of dross to the cut surfaces of the products was not observed, and hanging of the molten glass was not confirmed. In addition, the symmetry in the thickness direction of each of the cut surfaces was very satisfactory.

REFERENCE SIGNS LIST

Reference Signs of Embodiments of First Invention 1 glass sheet cutting device
2 support stage
21 stage main body
22 conveyer
3 laser irradiator
31 lens
4 side assist gas jet nozzle
5 center assist gas jet nozzle
6 auxiliary side assist gas jet nozzle
7 first suction nozzle
8 second suction nozzle
A1 side assist gas
A2 center assist gas
A3 auxiliary side assist gas
C irradiation portion
G glass sheet
Ga product portion
Ga1 fused end surface
Gb non-product portion
Gb1 fused end surface
LB laser beam
S non-support space Reference Signs of Embodiments of Fourth Invention 1 glass sheet cutting device
2 assist gas jet nozzle
3 laser irradiator
4 side assist gas jet nozzle
5 condenser lens
6 center assist gas introducing path
7 support stage
A1 assist gas
A2 side assist gas
A3 center assist gas
L laser beam
G glass sheet
G1 product portion
G2 non-product portion
S front surface of glass sheet
B back surface of glass sheet
C irradiation portion
H recessed portion
F cut surface of product portion
W inclined wall portion
α jetting angle
M molten glass portion
M1 volatilized molten particle
Z imaginary cutting line

The invention claimed is:

1. A cutting method for a glass sheet, comprising radiating a laser beam to a cutting portion of the glass sheet while jetting an assist gas to the cutting portion, to thereby divide the glass sheet by fusing into a product portion and a non-product portion using the cutting portion as a boundary,
wherein the assist gas comprises:
a center assist gas jetted just below from a position above the cutting portion to the cutting portion in a space above the glass sheet; and
a side assist gas jetted obliquely downward from an upper position on a product portion side to the cutting portion in a space above the glass sheet, and
wherein the side assist gas has a jetting pressure that is higher than a jetting pressure of the center assist gas so that a fused end surface of the product portion comprises a convex curved portion.

2. The cutting method for a glass sheet according to claim 1, wherein the side assist gas is jetted at an inclination angle of from 25° to 60° with respect to an upper surface of the glass sheet.

3. The cutting method for a glass sheet according to claim 1, wherein the assist gas further comprises an auxiliary side assist gas jetted obliquely upward from a lower position on the product portion side to the cutting portion in a space below the glass sheet.

4. The cutting method for a glass sheet according to claim 1, wherein the radiating the laser beam to the glass sheet is carried out in a defocus state.

5. The cutting method for a glass sheet according to claim 1, wherein a center line of the side assist gas is set to intersect with an upper surface of the glass sheet of the product portion side with respect to the cutting portion.

* * * * *